(12) United States Patent
Muraoka

(10) Patent No.: US 7,648,129 B2
(45) Date of Patent: Jan. 19, 2010

(54) FLUID FILLED VIBRATION DAMPING DEVICE AND METHOD OF MANUFACTURING THE SAME

(75) Inventor: Mutsumi Muraoka, Aichi-gun (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 419 days.

(21) Appl. No.: 11/635,608

(22) Filed: Dec. 8, 2006

(65) Prior Publication Data

US 2007/0138718 A1     Jun. 21, 2007

(30) Foreign Application Priority Data

Dec. 15, 2005   (JP) .............................. 2005-362299

(51) Int. Cl.
    *F16F 13/00*   (2006.01)
(52) U.S. Cl. .............................. 267/140.13; 267/140.11
(58) Field of Classification Search ............ 267/140.13, 267/140.11, 219, 140.14, 141.4; 248/562, 248/636
    See application file for complete search history.

(56) References Cited

U.S. PATENT DOCUMENTS

| | | | | |
|---|---|---|---|---|
| 5,992,833 A | * | 11/1999 | Tanahashi | 267/140.14 |
| 6,491,290 B2 | * | 12/2002 | Muramatsu et al. | 267/140.14 |
| 6,523,813 B1 | * | 2/2003 | Kato | 267/140.11 |
| 6,659,436 B2 | * | 12/2003 | Muramatsu et al. | 267/140.13 |
| 6,902,156 B2 | | 6/2005 | Muramatsu et al. | |
| 6,971,639 B2 | | 12/2005 | Okada et al. | |
| 7,025,341 B2 | * | 4/2006 | Ichikawa et al. | 267/140.14 |
| 7,350,776 B2 | * | 4/2008 | Muramatsu et al. | 267/140.14 |

FOREIGN PATENT DOCUMENTS

| | | |
|---|---|---|
| JP | A 2001-336564 | 12/2001 |
| JP | A 2004-144238 | 5/2004 |

* cited by examiner

*Primary Examiner*—Robert A Siconolfi
*Assistant Examiner*—Mariano Sy
(74) *Attorney, Agent, or Firm*—Oliff & Berridge, PLC

(57) ABSTRACT

A fluid filled vibration damping device including: a main rubber elastic body connecting first and second mounting members; a partition member and a fastening member axially superposed together and secured fitting into the second mounting member. The partition member has a recess on a side of the fastening member, where an annular mounting fitting having a flange portion is inserted with a seal rubber projection disposed on one axial end thereof and projecting axially outward from the flange portion pressed fluid-tightly in an axial direction against the partition member around an entire circumference. An other axial end of the mounting fitting is fastened fluid-tightly onto a mating projection portion formed on the fastening member via a seal rubber layer. A diametrical gap is formed between an inside face of the recess of the partition member and the flange portion of the mounting fitting as well as the seal rubber projection.

11 Claims, 8 Drawing Sheets

FLUID FILLED VIBRATION DAMPING DEVICE AND METHOD OF MANUFACTURING THE SAME

INCORPORATED BY REFERENCE

The disclosure of Japanese Patent Application No. 2005-362299 filed on Dec. 15, 2005 including the specification, drawings and abstract is incorporated herein by reference in its entirety.

BACKGROUND OF THE INVENTION

1. Field of the Invention

The present invention relates generally to fluid filled vibration damping devices each designed to produce vibration damping effect based on the flow behavior of a non-compressible fluid sealed therein, and more particularly to a fluid filled type vibration damping device having a partition member positioned therein to form a plurality of fluid chambers, which chambers communicate with one another through fluid flow passages or the like.

2. Description of the Related Art

Fluid filled vibration damping devices capable of exhibiting vibration damping effect based on resonance or other flow action or behavior of a non-compressible fluid sealed therein are known in the art, as vibration damping devices, such as vibration damping support or vibration damping couplings, intended for installation between components that make up a vibration transmission system. U.S. Pat. No. 6,902,156 discloses one example of the vibration damping device of this kind, wherein a first mounting member is positioned next to one opening of a second mounting member of tubular shape, and the first mounting member and second mounting member are elastically connected by a main rubber elastic body. The device is used as an automotive engine mount, for example.

This type of fluid filled vibration damping device includes typically a plurality of fluid chambers provided therein, and fluid flow passages connecting these fluid chambers. Through appropriate adjustment of the passage length or cross section of the fluid flow passages, vibration damping effect based on resonance of other flow behavior of the fluid caused to flow through the fluid flow passages can be achieved against vibration in particular frequency band or bands to be damped.

As one type of structure for forming the multiple fluid chambers and fluid flow passages, such as that taught in U.S. Pat. No. 6,902,156, it is proposed to utilize a partition member that is secured fit internally into the second mounting member. This partition member has a recess which opens outward in the axial direction, with the opening of the recess being covered by a rubber elastic plate. By securing the partition member fit into the tubular section of the second mounting member, a primary fluid chamber is formed between the partition member and the main rubber elastic body, while an auxiliary fluid chamber is formed in the recess of the partition member. A fluid flow passage connecting the primary fluid chamber and the auxiliary fluid chamber is formed, utilizing the partition member.

It is further proposed to position a fastening member superposed against the partition member on the end face thereof where the opening of the recess is located, so that the rubber elastic plate is covered from the outside by this fastening member, thereby forming a working air chamber situated to the opposite side of the rubber elastic plate from the auxiliary fluid chamber. By forming this working air chamber, the rubber elastic plate can be prevented from interfering with other components thus protecting the rubber elastic plate, while at the same time permitting elastic deformation of the rubber elastic plate. Also, through appropriate adjustment of air pressure in the working air chamber for example, it is possible to adjust the spring rigidity, and hence the vibration damping characteristics, of the auxiliary liquid chamber, a portion of whose wall is constituted by the rubber elastic plate. It is further possible, as taught in U.S. Pat. No. 6,902,156, to efficiently ensure space for forming a variable-capacity equilibrium chamber, situated to the opposite side of the partition member from the working air chamber.

However, the inventors have recently found that with fluid filled vibration damping devices of such conventional design, it is difficult to achieve consistent tuning characteristics on the part of the fluid flow passages, creating the problem that variability of vibration damping characteristics tends to occur easily among products.

Research conducted by the inventors as to the cause of this problem led to the discovery that a significant cause of variability among products probably lies in the characteristics of the auxiliary fluid chamber, and particularly the spring rigidity of the auxiliary fluid chamber wall. Additional research showed that the movable rubber film which constitutes a part of the wall of the auxiliary fluid chamber is subjected to unanticipated strain and stress during the vibration damping device manufacturing process. Thus, even where the spring characteristics of the movable rubber films are the same prior to assembly, it may possibly occur that significant variability in the spring characteristics thereof may arise after assembly.

Specifically, during the process of fastening the movable rubber film at the outside peripheral edge thereof to the opening of the recess of the partition member in order to form the auxiliary fluid chamber, it is necessary to ensure a sufficient level of fluid-tightness both in the auxiliary fluid chamber formed to one side of the movable rubber film, and in the working air chamber formed to the other. Accordingly, in the conventional design disclosed in U.S. Pat. No. 6,902,156, a mounting fitting of ring shape is pre-attached to the outside peripheral face of the movable rubber film, and this mounting fitting is secured mating fluid-tightly with the partition member and the fastening member. Namely, a mating projection that projects out towards the recess of the partition member is formed on the fastening member, and the edge of one open axial end of the mounting fitting affixed to the outside peripheral face of the movable rubber film is fastened externally onto this mating projection portion. Then, when this fastening member is superposed against the partition member, the mounting fitting affixed to the outside peripheral face of the movable rubber film is secured press-fit into the opening of the recess of the partition member. Subsequently, the partition member and the fastening member that have been assembled together with the movable rubber film are positioned inserted within the tubular section of the second mounting member. In this state, the tubular section is subjected to a diameter-constricting process so as to attach them integrally fitting into the second mounting member.

However, during the process of fastening the partition member and the fastening member in state of being fitted into the second mounting member, it is difficult to maintain concentricity of the partition member and the fastening member, which were originally separate components. Consequently, in the course of the tubular section of the second mounting member being subjected to the diameter-constricting process, the partition member and the fastening member may shift out of position relative to each other in the axis-perpendicular direction. Thus, the mounting fitting, which is fastened respectively to both the partition member and the fastening member, undergoes deformation in association with this shifting out of position of the two members in the axis-perpendicular direction. As a result, there may be a loss of seal in areas of the mounting fitting that mate with the partition member and the fastening member, with a resultant possible drawback that sufficient fluid-tightness in the auxiliary fluid chamber or working air chamber cannot be assured. Also, it may possibly occur that the desired spring properties will not be attained due to deformation or stress of the movable rubber film, induced in the movable rubber film by deformation of the mounting fitting.

SUMMARY OF THE INVENTION

It is therefore one object of this invention to provide a fluid filled vibration damping device of novel construction, which is capable of assuring consistent sealing among the rubber elastic plate, the partition member, and the fastening member, while consistently achieving the desired spring properties in the rubber elastic plate, thereby effectively producing the intended vibration damping action. It is another object of the present invention to provide a method of manufacturing the fluid filled vibration damping device.

The above and/or other objects of this invention may be attained according to at least one of the following aspects of the invention. The following aspects and/or elements employed in each aspect of the invention may be adopted at any possible optional combinations. It is to be understood that the principle of the invention is not limited to these aspects of the invention and combinations of the technical features, but may otherwise be recognized based on the teachings of the present invention disclosed in the entire specification and drawings or that may be recognized by those skilled in the art in the light of the present disclosure in its entirety.

A first aspect of the invention provides a fluid filled vibration damping device comprising: a first mounting member; a second mounting member of tubular shape and being positioned with a first axial open end thereof oriented toward the first mounting member; a main rubber elastic body elastically connecting the first mounting member and the second mounting member so that the first axial open end of the second mounting member is fluid-tightly closed by means of the rubber elastic body; a partition member disposed fitting within and supported fixedly at an axial medial portion of the second mounting member forming between the main rubber elastic body and the partition member a primary fluid chamber whose wall is partially defined by the main rubber elastic body, and being filled with a non-compressible fluid, the partition member being furnished with a recess that opens onto a side thereof opposite from the primary fluid chamber; a rubber elastic plate covering an opening of the recess so as to form an auxiliary fluid chamber whose wall is partially defined by the rubber elastic plate, and being filled with the non-compressible fluid; a fluid flow passage permitting a fluid communication between the primary fluid chamber and the auxiliary fluid chamber; a fastening member superposed against an axial end of the partition member where the opening of the recess is situated, the fastening member being fitted into the second mounting member together with the partition member, and secured fitting therein by means of diameter constriction of the second mounting member; and a working air chamber being formed by means of cooperation between the rubber elastic plate and the fastening member, and being situated to an opposite side of the rubber elastic plate from the auxiliary fluid chamber; an annular mounting fitting affixed to an outside peripheral edge of the rubber elastic plate, and having a flange portion flaring diametrically outward at one axial end thereof such that a maximum outside diameter dimension of the annular mounting fitting inclusive of the flange portion is smaller than an inside diameter dimension of the recess of the partition member, while two axial ends of the mounting fitting extend outwardly from the rubber elastic plate; a seal rubber projection disposed on one of the two axial ends of the mounting fitting so as to project axially outward from the flange portion; a seal rubber layer formed covering an inside peripheral face of an other of the two axial ends of the mounting fitting; and a mating projection portion formed on the fastening member so as to project towards the recess of the partition member, wherein the other of the two axial ends of the mounting fitting is fastened externally and fluid-tightly onto the mating projection portion with the seal rubber layer sandwiched therebetween and the mounting fitting is inserted into the recess of the partition member, wherein with the seal rubber projection projected from the one of the two axial ends of the mounting fitting pressed fluid-tightly in an axial direction against the partition member around an entire circumference, and with a gap formed in a diametrical direction between an inside face of the recess of the partition member and the flange portion of the mounting fitting as well as the seal rubber projection, the partition member and the fastening member are fastened fitting together with the second mounting member.

In the fluid filled vibration damping device constructed according to the present invention, a fluid-tight seal between the partition member and the mounting fitting is assured by means of the seal rubber projection projecting in the axial direction from the mounting fitting being pressed against the partition member in the axial direction. Additionally, gaps are furnished between the diametrically opposed inside face of the recess of the partition member and the mounting fitting as well as the seal rubber projection on the other. In the present invention which employs this combination of both an axial direction seal structure and a diametrical direction gap structure, even in the event that the partition member and the fastening member should shift out of position relative to each other in the axis-perpendicular direction due to diameter constriction of the tubular section of the second mounting member during the process of attaching the partition member and the fastening member to the second mounting member, the position shift will be absorbed by the gaps established between the diametrically opposed recess inner face of the partition member and the mounting fitting.

Consequently, even in the event that the partition member and the fastening member should experience relative displacement in the axis-perpendicular direction during the manufacturing process, deformation of the mounting fitting can be avoided and the rubber elastic plate will not be subjected to deformation or strain. Additionally, areas where the mounting fitting fits externally onto the fastening member will not be subjected to a high level of outside force, and a good seal can be consistently maintained. Also, in addition to employing an axial direction sealing structure between the mounting fitting and the partition member, even in the final assembled state, a gap remains between the diametrically opposed outside peripheral face of the seal rubber projection and the recess inside face of the partition member, whereby elastic deformation in the seal rubber projection can be consistently permitted.

Specifically, within the recess of the partition member, not only is displacement of the mounting fitting not restricted by contact against the recess inside face, but also deformation of the seal rubber projection is not restricted by filling the space between the partition member and the fastening member in the diametrical and axial directions. Consequently, even in the event that the partition member and the fastening member should experience relative displacement in the axis-perpendicular direction during diameter constriction of the second mounting member, a sealed state can be maintained consistently based on elastic deformation of the seal rubber projection, and high reliability of fluid-tightness in the fluid filled zones, including the auxiliary fluid chamber, can be attained.

The mounting fitting and the seal rubber projection are each attached across a gap in the diametrical direction from the inside peripheral face of the recess of the partition member. Accordingly, in the event that relative displacement of the partition member and the fastening member in the axis-perpendicular direction should be produced during diameter constriction of the second mounting member, it is possible to prevent, to the extent possible, areas where the mounting fitting and the fastening member are fastened fitting together from being subjected to outside force. Consequently, it is possible to consistently maintain sealing in the area where the axial other end of the mounting fitting fits together with the mating projection portion of the fastening member, and thereby to achieve high reliability of fluid-tightness in the working air chamber as well. Additionally, action of outside force on the mounting fitting can be avoided, and deformation of the mounting fitting can also be avoided to the extent possible. As a result, the occurrence of unanticipated stress or strain in the rubber elastic plate due to external force or deformation thereof can be avoided to the extent.

In the fluid filled vibration damping device of construction according to the first aspect of the present invention, the auxiliary fluid chamber and the working air chamber can be maintained consistently in fluid-tight condition, and the rubber elastic plate will be able to exhibit stable spring properties. It is accordingly possible to consistently realize high levels of desired vibration damping ability and reliability.

In the fluid filled vibration damping device according to the first aspect of the invention, there is preferably employed an arrangement an outside diameter dimension of the mounting fitting changes at an axially medial portion of a tubular section thereof such that an outside diameter dimension at the one of the two axial ends of the mounting fitting where the seal rubber projection is formed is larger than that of the other of the two axial ends of the mounting fitting. With this arrangement, the mounting fitting can advantageously provide the planar area of support and support strength for the seal rubber projection in the axial direction. This makes it possible to further improve axial compressive force, and hence sealing ability, of the seal rubber projection.

The change in outside diameter dimension in the tubular section of the mounting fitting may take the form of a step portion, or be of tapering shape. The zone of change in outside diameter dimension may extend the entire length of the tubular section in the axial direction, or over a portion thereof. Further, it is sufficient merely for the zone of change in outside diameter dimension to be furnished in the final fluid filled vibration damping device. For instance, a mounting fitting of constant outside diameter dimension over its entire length prior to assembly could be subjected to diameter constriction performed exclusively on the end thereof mating with the mating projection portion in the axial direction during mating with the mating projection portion. Thus, in the final assembled state, the mounting fitting is provided with a zone of change in outside diameter dimension.

In the fluid filled vibration damping device according to the first aspect of the invention, there may be formed an air passage through which air pressure is exerted on the working air chamber from the outside. Where such an air passage is formed, it will be possible to control vibration damping characteristics. More specifically, for example, by statically changing the air pressure in the working air chamber through the air passage on the basis of change in vibration to be damped, the spring properties of the rubber elastic plate can be adjusted by the air spring action of the working air chamber, making it possible to switch the vibration damping characteristics depending on a change in the vibration being damped. Alternatively, periodic air pressure fluctuations depending on the vibration frequency to be damped can be exerted on the working air chamber through the air passage, producing exciting force through the agency of the rubber elastic plate and thereby making it possible to obtain active vibration damping effect canceling out the vibration being damped. The air passage may be advantageously formed, for example, with a structure so as to extend perforating the interior of the fastening member and exit from the second mounting member or pass through a window provided to the second mounting member, to open to the outside on the surface of the fastening member lying directly exposed to the outside. This outside opening can be connected with an externally provided separate air conduit.

In the fluid filled vibration damping device discussed above, there is preferably employed a structure wherein an annular mating projection that projects diametrically inward is integrally formed at an opening of the other of the two axial ends of the mounting fitting; and a mating groove is formed extending around the entire circumference on the outside peripheral face of the mating projection portion of the fastening member. The annular mating projection inserted into and mated with the mating groove, thereby preventing the mounting fitting from becoming detached from the mating projection portion. With such a mating structure, it is possible to reliably prevent the rubber elastic plate from becoming detached when the rubber elastic plate is subjected to fluid pressure or air pressure, so as to improve product reliability. Additionally, since the mounting fitting can be more reliably fitted externally onto the mating projection portion via the seal rubber layer, it is possible to ensure a higher level of sealing in areas where the fitting is externally fastened, and hence of fluid-tightness of the working air chamber.

In the fluid filled vibration damping device according to the first aspect of the present invention, there is preferably employed a structure wherein a flexible film is disposed at an opening of an other axial end of the second mounting member so as to form an equilibrium chamber whose wall is partially defined by the flexible film to a side of the auxiliary fluid chamber opposite from the primary fluid chamber. The equilibrium chamber is filled with the non-compressible fluid and a first orifice passage is formed for connecting the equilibrium chamber to the primary fluid chamber. With this arrangement, the equilibrium chamber and the first orifice passage can be formed compactly. Further, by tuning the first orifice passage differently from the fluid flow passage, the vibration damping device is able to exhibit vibration damping effect, on the basis of resonance behavior of fluid caused to flow through the orifice passage, in a frequency range different from the frequency at which vibration damping action is exhibited by the fluid flow passage.

In the fluid filled vibration damping device as discussed above, there is preferably employed a structure wherein a second orifice passage is formed connecting the auxiliary fluid chamber to the equilibrium chamber, with the second orifice passage being tuned to a higher frequency band than the first orifice passage. In this structure, on the basis of fluid flow behavior through the first orifice passage and through the second orifice passage tuned to a higher frequency band than the first orifice passage, even better vibration damping action is attained against vibration in multiple, wide frequency bands.

Further, in the fluid filled vibration damping device discussed above, there is preferably employed a structure furnished with a fluid flow level limiting member for limiting fluid flow level through the fluid flow passage. According to this structure, ample fluid flow level through the first orifice passage or the second orifice passage is assured, leading to further improvement in vibration damping action by fluid flow action.

There is also preferably employed a structure wherein, during formation of the equilibrium chamber and first orifice passage of this kind, for example, wherein the second mounting member is fastened externally onto one axial end of the fastening member; and an other axial end of the fastening member projects axially outward from the second mounting member; while an annular fastening fitting is bonded by vulcanization to an outside peripheral edge of the flexible film, and is fastened fitting to the other axial end of the fastening member projecting axially outward. With this arrangement, the flexible film can be easily attached with good seal to the fastening member.

A second aspect of the present invention provides a method of manufacturing a fluid filled vibration damping device of construction according to the first aspect of the present invention, wherein the method of manufacturing the fluid filled vibration damping device comprises the following steps: (a)-(d):

(a) a step of producing an integrally vulcanization molded component of the rubber elastic plate, by vulcanization molding the rubber elastic plate integrally having the seal rubber projecting portion and the seal rubber layer and bonded by vulcanization to the mounting fitting;

(b) a step of subjecting the mounting fitting of the integrally vulcanization molded component of the rubber elastic plate to a diameter constricting operation carried out with the mounting fitting fitted externally onto the mating projection portion of the fastening member which has been separately prepared, to fit together and fasten the other of the two axial ends of the mounting fitting with the mating projection portion.

(c) a rubber elastic plate attachment step wherein the fastening member is superposed against the partition member from a side thereof where opening of the recess is situated, the integrally vulcanization molded component of the rubber elastic plate fastened to the fastening member is inserted into the recess of the partition member, and the seal rubber projecting portion projected from the one of the two axial ends of the mounting fitting is pushed in the axial direction against the partition member; and (d) a step of subjecting the tubular section of the second mounting member to a diameter constriction process, carried out with the partition member and the fastening member superposed against one another in the axial direction and inserted into the tubular section of the second mounting member.

According to the method of the present invention, fluid-tightness on the part of the auxiliary fluid chamber and the working air chamber, and spring properties of the rubber elastic plate, can be attained consistently and with high reliability, without any increase in the number of parts or manufacturing steps, and without a difficult manufacturing operation. Consequently, it is possible to easily manufacture the desired fluid filled vibration damping device capable of exhibiting consistent vibration damping ability and endurance.

In the method of the present invention, the partition member and the fastening member will be superposed against each other in the axial direction and fastened together, prior to inserting the partition member and the fastening member into the tubular section of the second mounting member in the main rubber elastic body integrally vulcanization molded component. By fastening the partition member and the fastening member together in advance, even temporarily, the rubber elastic plate can be stably installed between the two components, and it will be possible to attach the partition member and the fastening member, with the attached rubber elastic plate, to the second mounting member by means of a simple operation. Fluid-tightness and vibration damping ability are stabilized thereby, and further improvement in ease of assembly is afforded as well.

In the method of the present invention, by means of vulcanization bonding the first mounting member and the second mounting member to the main rubber elastic body for example, there can be prepared an integrally vulcanization molded component wherein the opening at one axial end of the second mounting member is sealed off fluid-tightly by the main rubber elastic body; and the partition member and the fastening member can be attached and inserted into this integrally vulcanization molded component from the other opening of the second mounting member.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
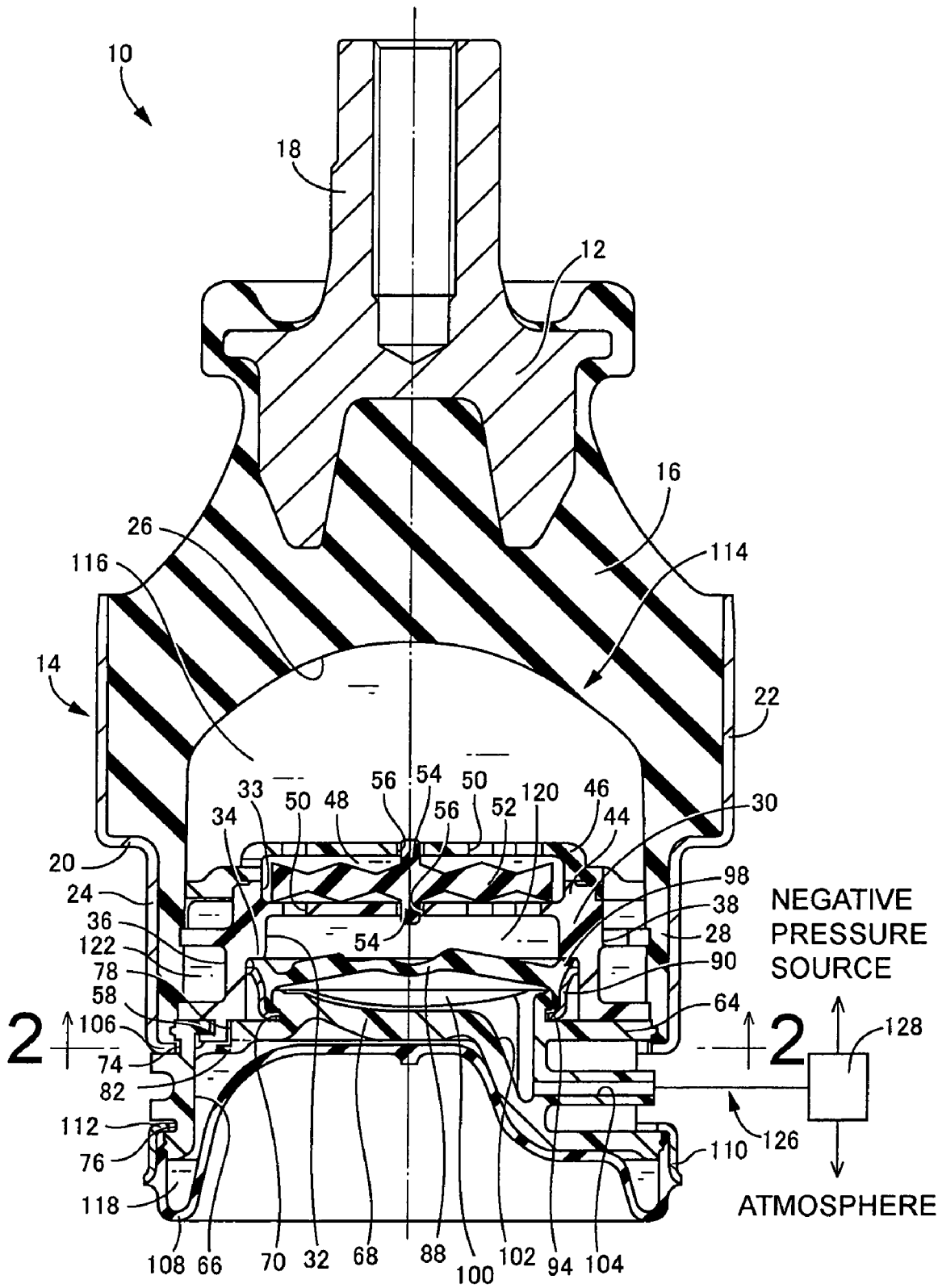
FIG. 1 is an elevational view in axial or vertical cross section of a fluid filled type vibration damping device in the form of an automotive engine mount of construction according to one preferred embodiment of the invention, taken along line 1-1 of FIG. 2.
Figure 2:
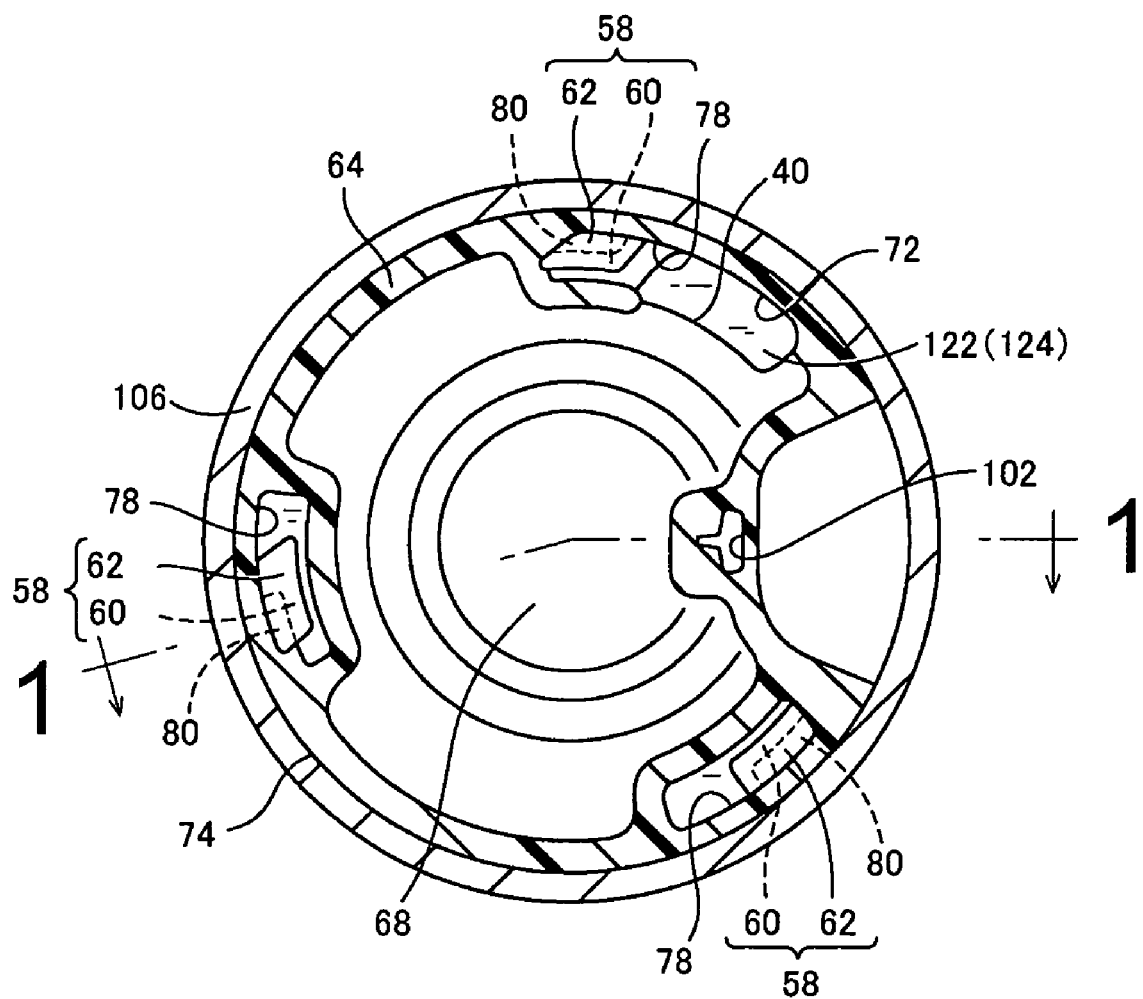
FIG. 2 is a cross sectional view taken along line 2-2 of FIG. 1.

Referring first to FIGS. 1 and 2, there is depicted a fluid filled type vibration damping device of an automotive engine mount 10 according to a first mode of the invention. This engine mount 10 includes a first mounting member 12 of metal, a second mounting member 14 of metal, and a main rubber elastic body 16 by which the first and second mounting members 12, 14 are elastically connected. By mounting the first mounting member 12 to a power unit side and mounting the second mounting member 14 to a body side of a vehicle, the power unit is supported in vibration-damping fashion on the vehicle body.

In FIG. 1, the engine mount 10 is shown as it would appear when not installed in an automobile. In the illustrated state, the distributed support load of the power unit would be input in the axial direction of the mounting (the vertical in FIG. 1). Accordingly, with the engine mount 10 in the installed state, on the basis of elastic deformation of the main rubber elastic body 16, the first mounting member 12 and second mounting member 14 will undergo displacement in the direction moving closer together, with the principal direction of input of vibration to be damped generally coincident with the axial direction of the mount. In the description hereinbelow the vertical direction shall as general rule refer to the vertical direction in FIG. 1.

Described more specifically, the first mounting member 12 has a generally cup shape open at the bottom. In the center portion of the upper base of the first mounting member 12 is integrally formed a nut portion 18 projecting upward, furnished with a screw hole which opens upward.

The second mounting member 14, meanwhile, has a large-diameter, stepped round tubular shape, with the section thereof above a step portion 20 formed in the axially medial portion constituting a large-diameter tube portion 22 and the section below constituting a small-diameter tube portion 24 of smaller diameter dimension than the large-diameter tube portion 22. The first mounting member 12 is position spaced apart to one side (above in FIG. 1) of the second mounting member 14, with the center axes of the two members 12, 14 being positioned on approximately the same line, and with the main rubber elastic body 16 disposed between the first mounting member 12 and the second mounting member 14.

The main rubber elastic body 16 has a large-diameter, generally frustoconical shape, and at its small-diameter end face is bonded by vulcanization the first mounting member 12, which is embedded in it substantially entirely except for the nut portion 18. At the outer circumferential face of the large-diameter end of the main rubber elastic body 16 is bonded by vulcanization the inside peripheral face of the large-diameter tube portion 22 and step portion 20 of the second mounting member 14.

That is, the main rubber elastic body 16 is constituted as an integrally vulcanization molded component with the first mounting member 12 and the second mounting member 14. With this arrangement, the first mounting member 12 and the second mounting member 14 are elastically connected together by means of the main rubber elastic body 16, with the opening at one side (the upper side in FIG. 1) of the large-diameter tube portion 22 of the second mounting member 14 sealed off fluid-tightly by the main rubber elastic body 16.

A large-diameter recess 26 of generally conical shape opening downward is formed to the large-diameter end face of the main rubber elastic body 16. A thin seal rubber layer 28 integrally formed with the main rubber elastic body 16 is formed on the inside peripheral face of the small-diameter tube portion 24 of the second mounting member 14, so as to cover substantially the entirety thereof, at generally uniform thickness.

The integrally vulcanization molded component of the main rubber elastic body 16 with the first mounting member 12 and the second mounting member 14 has a partition member 30 attached thereto from the opening on the other side (the small-diameter tube portion 24 side, namely, the lower side in FIG. 1) of the second mounting member 14.

Figure 3:
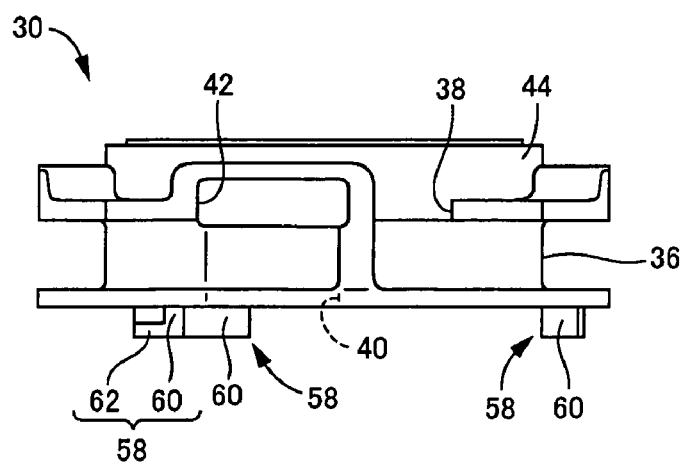
FIG. 3 is a side elevational view of a partition member of the engine mount of FIG. 1.
Figure 4:
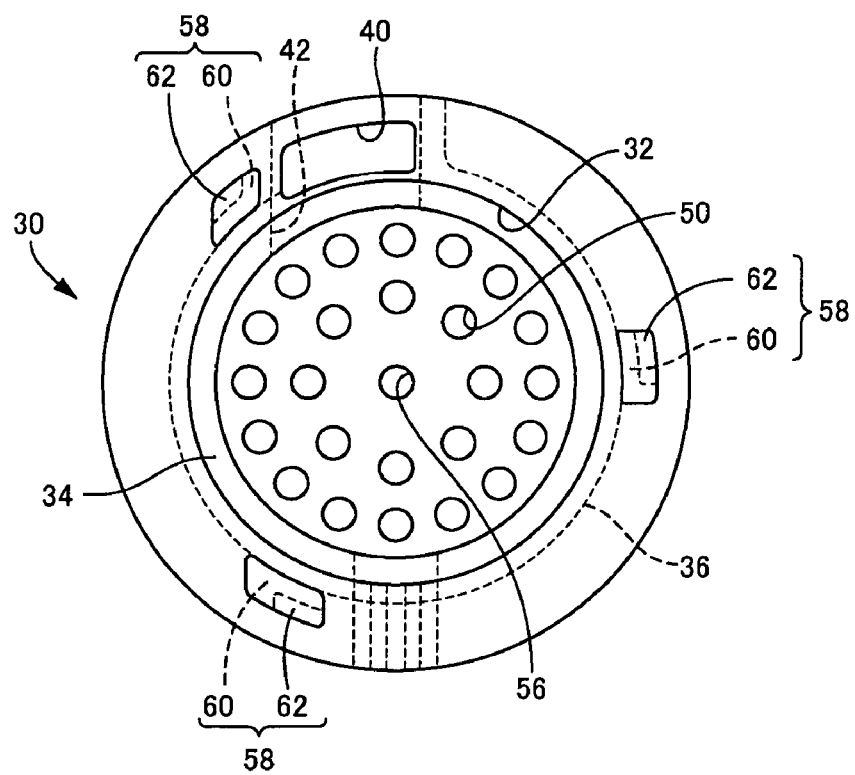
FIG. 4 is a bottom plane view of the partition member of FIG. 3.

As shown in FIGS. 3 and 4, the partition member 30 has an inverted cup shape. In this embodiment, the partition member 30 is formed of a rigid synthetic resin material, and has an outside diameter dimension smaller than the inside diameter dimension of the small-diameter tube portion 24 of the second mounting member 14. The partition member 30 has a recess in the form of large-diameter central recess 32 opening onto the center of the lower face thereof. An inner circumferential surface of the peripheral wall of the central recess 32 includes an annular step portion 34 that is positioned in the medial portion in the axial direction (in the depth direction) of the central recess 32, while spreading outward in the axis-perpendicular direction. In other words, an inside diameter dimension of the central recess 32 is made smaller on the top wall side (a small diameter portion on the upper side in FIG. 1) of the step portion 34 rather than the opening side (a large diameter portion on the lower side in FIG. 1) of the step portion 34.

The peripheral wall of the partition member 30 is formed with a circumferential groove 36 open in its an outer circumferential surface and extending a predetermined length in the circumferential direction (in this embodiment, just short of its circumference). One circumferential end of the circumferential groove 36 opens upward through a communication window 38 of notch shape formed in the upper end of the partition member 30. The other circumferential end of the circumferential groove 36 opens downward through a communication hole 40 perforating the lower end of the partition member 30. The other circumferential end of the circumferential groove 36 further extends upward and communicating with the inner circumferential face of the peripheral wall of the central recess 32 through a communication passage 42 perforating the peripheral wall of the partition member 30.

On the upper face of the top wall of the partition member 30 is formed a shallow upper recess 33 opening upward. The upper recess 33 has an inside diameter dimension approximately the same as the inside diameter dimension of the central recess 32 of the partition member 30. The peripheral wall of the upper recess 33 constitutes an annular projection 44 of annular shape projecting upward. A cover member 46 is superposed from above against the top wall of the partition member 30, thereby covering the upper recess 33 of the partition member 30.

The cover member 46 has a shallow, inverted bowl shape and is formed using a rigid material such as synthetic resin material. The cover member 46 is superposed on the upper face of the partition member 30 with the openings of their recesses being mutually aligned. Namely, distal end faces of the peripheral wall of the upper recess 33 of the partition member 30 and the peripheral wall of the cover member 46 are superposed on each other and fixed together by welding, bonding or the like. A bottom wall of the upper recess 33 of the partition member 30 and a top wall of the cover member 46 are both circular flat faces, and are vertically opposed to each other with a given spacing therebetween in a mutually parallel fashion. Thus, a hollow constrained installation zone 48 is formed between these opposed circular flat faces.

A plurality of through holes 50 of small holes are formed through both the upper and lower wall portions of the constrained installation zone 48 consisting of the bottom wall of the upper recess 33 of the partition member 30 and the top wall of the recess of the cover member 46. Via these through holes 50, the constrained installation zone 48 is communicating with axially upper and lower outside zones. That is, in this embodiment, these constrained installation zone 48 and through holes 50, 50 formed on the upper and lower wall portions cooperate together to constitute a fluid flow passage which enables a primary fluid chamber 116 described later to communicate with an auxiliary fluid chamber 120 described later.

A movable plate 52 serving as a movable member is positioned housed within the constrained installation zone 48, arranged spreading in the axis-perpendicular direction. The movable plate 52 has a thin, generally circular disk shape and is formed of a rubber elastic material. In this embodiment in particular, a plurality of irregularities or a plurality of corrugations are furnished on both the upper and lower faces of the movable plate 52 respectively, so that it has a large undulating face that can be visually confirmed. The thickness dimension of the movable plate 52 is smaller than the distance between the opposed faces of the upper and lower wall portions of the constrained installation zone 48. The outside diameter dimension of the movable plate 52 is smaller than the inside dimension of the inside diameter of the constrained installation zone 48. A pair of center axis portions 54, 54 projecting to either side in the axial direction are integrally formed on the center portion of the movable plate 52. Each center axis portion 54 fits displaceably inserted into a through hole 56 perforating the center axes of the partition member 30 and the cover member 46 respectively.

By means of this design, the movable plate 52 is positioned in the approximate center of the constrained installation zone 48 so as to be capable of displacement in the axial direction in the constrained installation zone 48 by the distance equivalent to the difference between the thickness dimension of the movable plate 52 and the height dimension of the constrained installation zone 48. The extent of axial displacement of the movable plate 52 is limited by means of the movable plate 52 striking against the upper and lower inside face of the constrained installation zone 48. During this striking of the movable plate 52 against the upper and lower inside face of the constrained installation zone 48, cushioning function is exhibited based on elasticity of the movable plate 52 per se, thereby avoiding striking noise and shock.

An outside peripheral portion around the opening of the central recess 32 of the partition member 30 provides a lower end face of a planar face spreading in the axis-perpendicular direction, where mating projections 58 are integrally formed so as to project downward. In this embodiment in particular, three mating projections 58, 58, 58 are situated in the widthwise central portion of the lower end face of the partition member 30 at approximately equal intervals in the circumferential direction. Each mating projection 58 is composed of a leg portion 60 extending downward with a generally unchanging "L" shaped cross section from a basal end portion integrally formed with the lower end portion of the partition member 30, and a head portion 62 spreading with a generally flat plate profile in the axis-perpendicular direction of the partition member 30 from the distal end portion of the leg portion 60, while covering the distal end of the leg portion 60. With this arrangement, the axial cross section of the mating projection 58 has a key shape overall.

Figure 5:
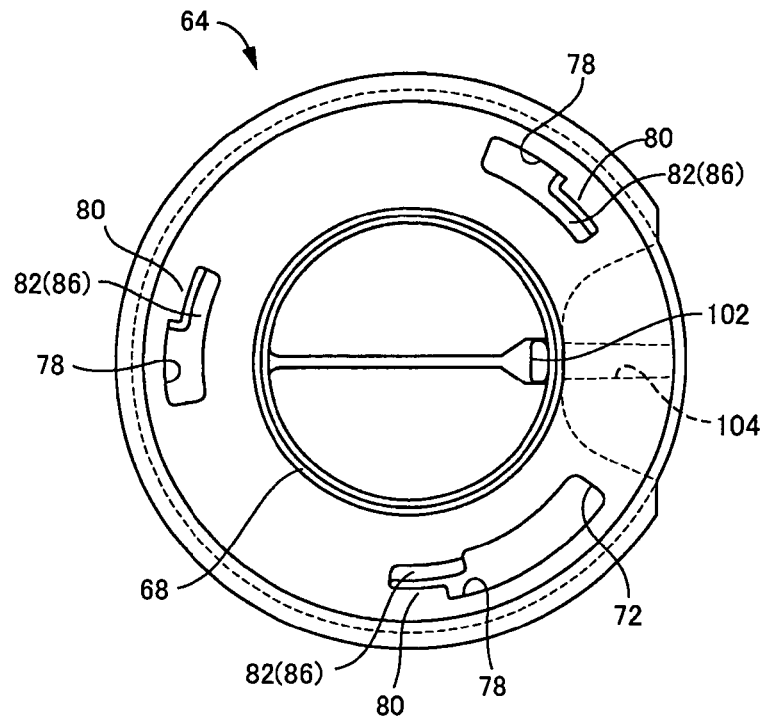
FIG. 5 is a top plane view of a fastening member of the engine mount of FIG. 1.
Figure 6:
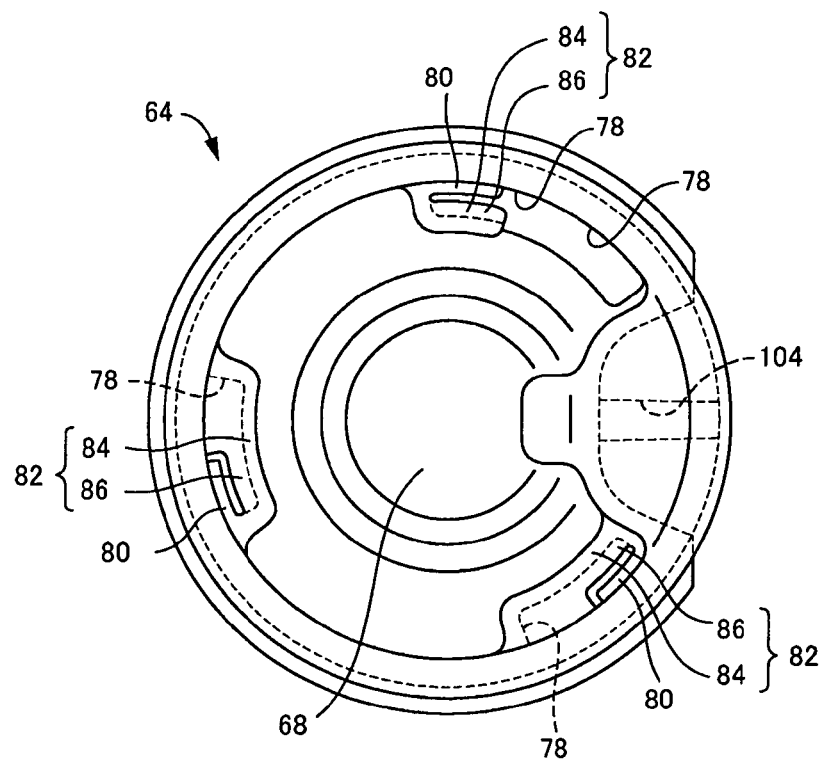
FIG. 6 is a bottom plane view of the fastening member of FIG. 5.

A fastening member 64 is superposed and attached to the partition member 30 from axially below. As shown in FIGS. 5 and 6, the fastening member 64 has a generally circular disk shape with its outside diameter dimension approximately the same as that of the partition member 30. The fastening member 64 has a lower recess 66 opening onto the center of its lower face. The fastening member 64 further includes a mating projection portion in the form of a center projection 68 of shallow bowl shape integrally formed at the center of its upper end face.

On an outer circumferential surface of the center projection 68, a fitting groove 70 serving as a mating groove is formed at its basal end portion so as to extend continuously over its entire circumference. The upper end face of the fastening member 64 is a planar face spreading in the axis-perpendicular direction over the entire face of the outside peripheral portion of the center projection 68. In the outside peripheral portion of the fastening member 64, a through hole 72 perforating in the axial direction is formed at the position corresponding to the opening of the communication hole 40 when the fastening member 64 is superposed against the partition member 30. This through hole 72 is open to either side in the axial direction, respectively to the upper end face of the fastening member 64 and the inner face of the lower recess 66.

On an outer circumferential surface of the fastening member 64, an upper mating groove 74 of concave groove shape is formed circumferentially extending continuously over the entire circumference near the axial upper end. Likewise, near the axial lower end of the outer circumferential surface of the fastening member 64, a lower mating groove 76 of concave groove shape is formed circumferentially extending continuously over the entire circumference.

On the radially outer side of the central projection 68 of the fastening member 64, an annular upper end face extends in the radially outward direction. This annular upper end face is formed with engaging holes 78 at respective circumferential positions corresponding to the mating projections 58 of the fastening member 64 superposed against the partition member 30. Each engaging hole 78 extends a predetermined length in the circumferential direction of the fastening member 64. The shape and size of the engaging holes 78 are arranged so that each mating projection 58 can be inserted into the corresponding engaging hole 78 and can experience relative displacement at a prescribed amount in the circumferential direction.

At one circumferential end of the engaging hole 78 is integrally formed an outside peripheral wall portion 80 that extends inward so as to partly project into the engaging hole 78. As will be described later, the mating projection 58 being inserted into the engaging hole 78 is circumferentially displaced relative to the outside peripheral wall portion 80, thereby coming into engagement with the outside peripheral wall portion 80.

Figure 9:
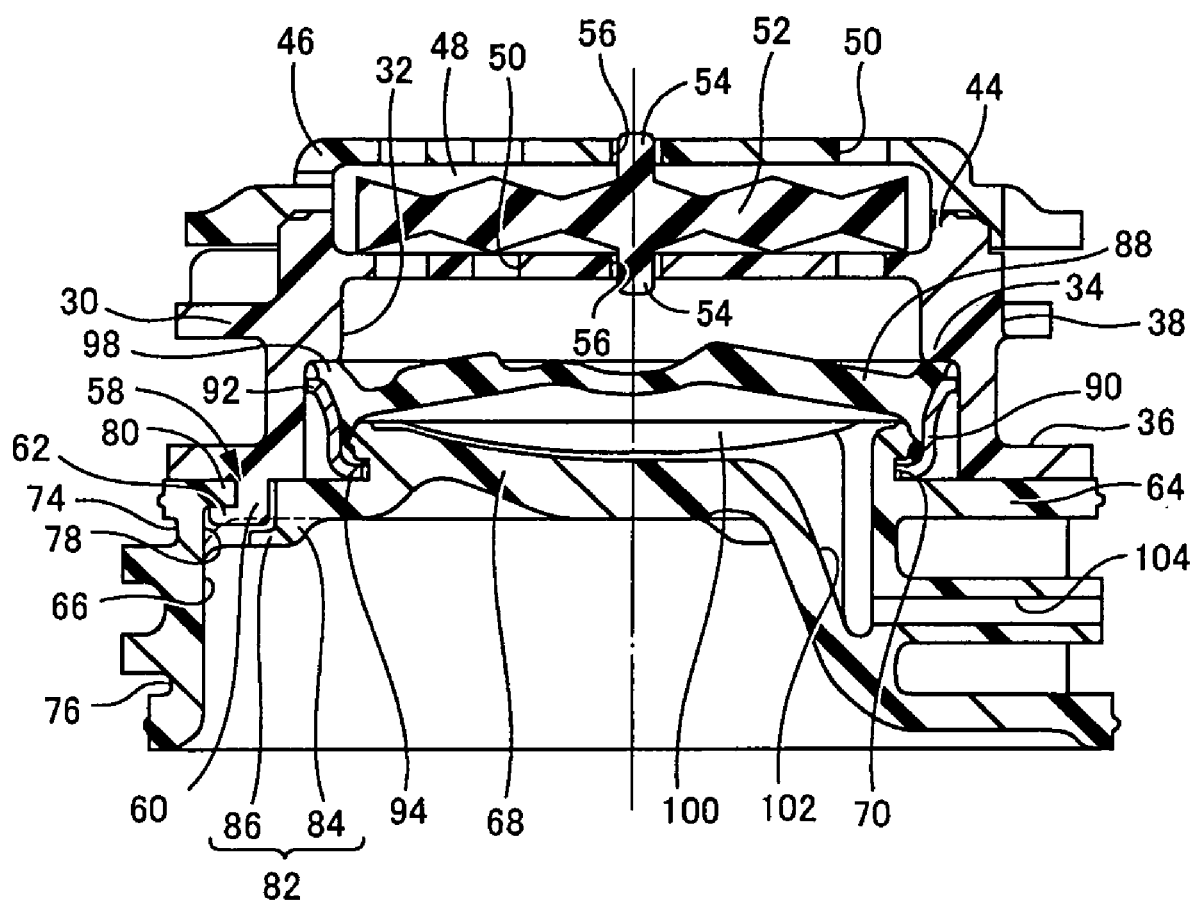
FIG. 9 is an enlarged vertical cross sectional view for illustrating one manufacturing process of the engine mount of FIG. 1.

Underneath each engaging hole 78 of the fastening member 64, a cover member 82 is integrally formed so as to cover the opening of the engaging hole 78 from below. As shown in FIG. 9, the cover member 82 includes a vertical wall portion 84 of generally unchanging rectangular frame cross section extending downward from the rim of the opening of the engaging hole 78, and a lid wall portion 86 of generally flat plate shape bent in the diametrical direction of the fastening member 64 from the distal edge portion of the vertical wall portion 84.

A pressure regulating rubber plate 88 serving as a rubber elastic plate is attached to the center projection 68 of the fastening member 64. As depicted in enlarged view in FIGS. 7 and 8, the pressure regulating rubber plate 88 has a thin, generally disk shape. In this embodiment, on both sides of the pressure regulating rubber plate 88 are formed a plurality of irregularities, grooves, projecting ribs or the like which are made different from each other in thickness dimension. A fitting ring 90 serving as a mounting fitting is bonded by vulcanization to the outside peripheral edge (in this embodiment, at the outside peripheral face) of the pressure regulating rubber plate 88.

The fitting ring 90 has a thin, generally round tubular shape and is formed of a metal material such as iron, aluminum alloy, or the like. At the one axial end (upper end in FIG. 7) of the fitting ring 90 is integrally formed a flange portion 92 flaring diametrically outward around the entire circumference, while at the other axial end (lower end in FIG. 7) of the fitting ring 90 is integrally formed an engaging projection 94 serving as an annular mating projection extending diametrically inward around the entire circumference. Specifically, the outside diameter dimension of the one axial end of the fitting ring 90 where the flange portion 92 is integrally formed is larger than the outside diameter dimension of the other axial end where the engaging projection 94 is integrally formed.

In this embodiment, the part of the fitting ring 90 to which the pressure regulating rubber plate 88 is bonded by vulcanization is biased above the axially center part of the fitting ring 90. The axial lower end portion of the fitting ring 90 extends toward axially below from the outside peripheral face of the pressure regulating rubber plate 88. A thin sealing rubber layer 96 is formed on the lower end of this extending fitting ring 90 so as to cover the inside peripheral face of the lower end of the extending fitting ring 90 around the entire circumference. The inside diameter dimension of the inside peripheral face of the sealing rubber layer 96 is approximately the same as the inside diameter dimension of the inside peripheral face of the engaging projection 94.

Figure 7:
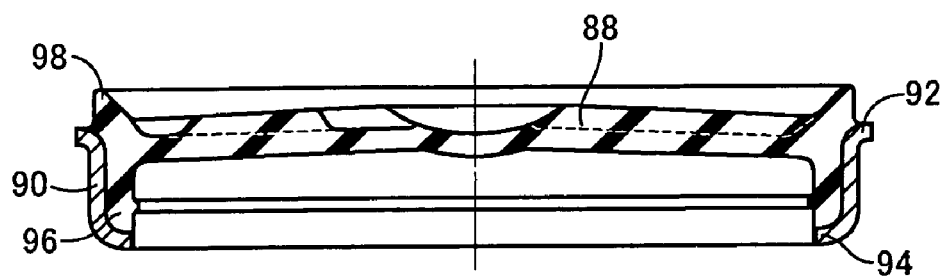
FIG. 7 is an enlarged vertical cross sectional view of a pressure regulating rubber plate 88 of the engine mount of FIG. 1, taken along line 7-7 of FIG. 8.
Figure 8:
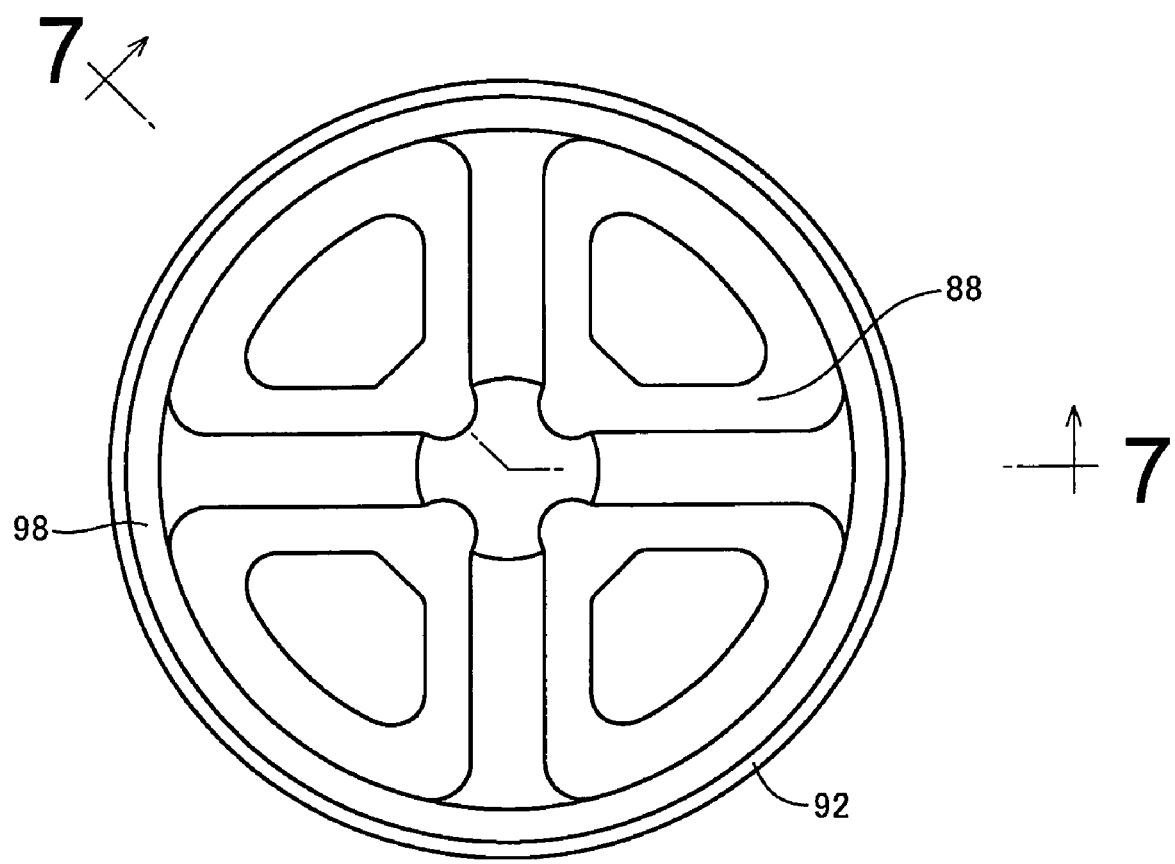
FIG. 8 is a top plane view of the pressure regulating rubber plate 88 of FIG. 7.

On the axial upper end of the fitting ring 90, as shown in FIG. 7, there is formed a sealing lip 98 serving as a seal rubber projection projecting axially upwardly. The sealing lip 98 is integrally formed with the pressure regulating rubber plate 88, being formed continuous all the way around in the circumferential direction with substantially unchanging cross section. The sealing lip 98 is formed on the axial upper end of the flange portion 92 of the fitting ring 90. In this mode in particular, the outside peripheral face of the sealing lip 98 has an outside diameter dimension slightly smaller than the outside diameter dimension of the flange portion 92, and has a vertical surface extending in the axial direction. Meanwhile, the inside peripheral face of the sealing lip 98 has an inclined surface extending diametrically inward, and is formed so as to extend in the axial direction to the upper portion of the engaging projection 94. In this embodiment, the pressure regulating rubber plate 88, sealing rubber layer 96, and sealing lip 98 are integrally vulcanization molded with the fitting ring 90. This completes the step of producing of an integrally vulcanization molded component of the pressure regulating rubber plate 88 in the method of manufacturing a fluid filled vibration damping device.

The axial lower end of this fitting ring 90 is fitted externally onto the center projection 68 of the fastening member 64. Then, the portion of the fitting ring 90 below the axially medial portion is subjected to 360 degree drawing or other diameter-constricting process, with the engaging projection 94 being fastened detained within the fitting groove 70 of the center projection 68. With this arrangement, the sealing rubber layer 96 undergoes compressive deformation in the diametrical direction and is sealed fluid-tightly between the fitting ring 90 and the center projection 68, with the fitting ring 90 being prevented from becoming detached from the center projection 68. With the lower portion of the fitting ring 90 being subjected to this diameter-constricting process, the outside diameter dimension of the upper end of the fitting ring 90 is established much larger than the outside diameter dimension of the lower end thereof. The fitting ring 90 is fastened detained within the fitting groove 70 of the center projection 68 by means of a diameter-constricting process, thereby completing the step of fitting together and fastening the other axial end (lower end in FIG. 7) of the fitting ring 90 with the center projection 68 that relates to the method of manufacturing a fluid filled vibration damping device of this mode.

Thus, the opening upper portion of the center projection 68 is covered by the pressure regulating rubber plate 88, so that a working air chamber 100 is formed between the bottom of the center projection 68 and the pressure regulating rubber plate 88. It should be noted that, the sealing rubber layer 96 ensures the assembled part of the center projection 68 and the pressure regulating rubber plate 88 a higher level of fluid-tightness and maintains the fluid-tightness of the working air chamber 100.

An air passage 102 is formed through the fastening member 64. One end of this air passage 102 is open in the upper face of the center projection 68 to be held in communication with the working air chamber 100, while the other end of the air passage 102 is open in the outside peripheral face of the fastening member 64. The other end of this air passage 102 is provided with a port 104 of a round tubular shape that is formed projecting within a circular recess opening in the outside peripheral face of the fastening member 64.

Further, the fastening member 64 is superposed against the lower face of the partition member 30, thereby the fitting ring 90 attached with the fastening member 64 is inserted into the central recess 32 of the partition member 30. Since the small diameter portion of the central recess 32 has a diameter smaller than an inside diameter dimension of the sealing lip 98, the flange portion 92 of the fitting ring 90 presses the sealing lip 98 against a stepped face of the step portion 34 of the central recess 32 in the axial direction. With this arrangement, the space between the fitting ring 90 and the partition member 30 is sealed fluid-tightly in the axial direction by the sealing lip 98 around the entire circumference. This completes the attachment step of the pressure regulating rubber plate 88 in the method of manufacturing a fluid filled vibration damping device according to this embodiment, wherein the sealing lip 98 formed projecting from one axial end (upper end in FIG. 7) of the fitting ring 90 is pushed in the axial direction against the partition member 30. In this embodiment in particular, the upper end face of the flange portion 92 of the fitting ring 90 is clamped in the axial direction with sufficiently large area via the sealing lip 98 against the surface of the step portion 34 formed all the way around the entire circumference of the central recess 32 of the partition member 30.

With the partition member 30 and the fastening member 64 superposed against each other in the axial direction, the mating projection 58 is inserted into the engaging hole 78, respectively, and the partition member 30 and the fastening member 64 are turned relative to each other about the center axis. Accordingly, each mating projection 58 is locked in place within the corresponding engaging hole 78 furnished with the outside peripheral wall portion 80. With this arrangement, as depicted in FIG. 9, the partition member 30 and the fastening member 64 are held superposed in the axial direction, and the sealing lip 98 undergoing compressive deformation in the axial direction between the flange portion 92 and the step portion 34 holds its state. Specifically, the elastic force of the sealing lip 98 exerts frictional power sufficient to hold the locked state of the partition member 30 and the fastening member 64.

Further, the circumferential locations about the center axis of the communication hole 40 of the partition member 30 and the through hole 72 of the fastening member 64 become aligned with each other when the partition member 30 and the fastening member 64 are turned relative to each other and held superposed by means of a locking mechanism including the mating projections 58, engaging holes 78 and outside peripheral wall portions 80. That is, this locking mechanism also functions as relative positioning means for the partition member 30 and the fastening member 64 in the circumferential direction.

Then, the partition member 30 and the fastening member 64 superposed against each other in the axial direction are inserted and secured fitting into the small diameter tube portion 24 side (the lower side in FIG. 1) of the second mounting member 14. This completes the step of fastening the partition member 30 and the fastening member 64 together in the state of being superposed against each other in the axial direction prior to inserting the partition member 30 and the fastening member 64 into the second mounting member 14 in the method of manufacturing a fluid filled vibration damping device according to this embodiment.

These partition member 30 and the fastening member 64 are attached to the second mounting member 14 in the following manner. Specifically, the partition member 30 and the fastening member 64 with the pressure regulating rubber plate 88 attached in advance are securely attached to each other in the superposed state as described above, and then inserted in the axial direction from the opening of the second mounting member 14. Subsequently, an internal flange-shaped mating projection 106 formed at the lower opening end of the second mounting member 14 is positioned in the outside peripheral face of the upper mating groove 74 of the fastening member 64.

In this state, only the axial upper end of the fastening member 64 is inserted into the second mounting member 14, while the portion of the fastening member 64 below the axially medial portion projects axially outward from the second mounting member 14 and lies exposed to the outside space. The recess furnished with the port 104 is open in the outside peripheral face of this fastening member 64 exposed to the outside.

Subsequently, the small diameter tube portion 24 of the second mounting member 14 is subjected to 360 degree drawing or other diameter-constricting process. With this arrangement, the seal rubber layer 28 formed covering the inner circumferential surface of the small diameter tube portion 24 is intimately contacted with the outside peripheral face of the partition member 30 and the upper end outside peripheral face of the fastening member 64. At the same time, the small diameter tube portion 24 is fastened externally onto the outside peripheral face of the partition member 30 and the upper end outside peripheral face of the fastening member 64 via the seal rubber layer 28. The mating projection 106 of the fastening member 64 is inserted into and locked in place within the upper mating groove 74 of the fastening member 64, whereby the fastening member 64 and the partition member 30 is axially aligned and fastened to the small diameter tube portion 24 consisting of the tubular wall portion of the second mounting member 14. With this arrangement, the second mounting member 14 is fastened externally onto one axial end (the upper end in FIG. 1) of the fastening member 64. As will be apparent from the preceding description, this completes the step of fastening the partition member 30 and the fastening member 64 to the second mounting member 14 at the same time in the method of manufacturing a fluid filled vibration damping device according to this embodiment.

Meanwhile, a diaphragm 108 serving as a flexible film is attached to the lower end of the partition member 30 lying exposed out of the second mounting member 14. The diaphragm 108 is constituted as a thin rubber elastic film of generally disk shape whose center portion has enough slack to allow it to deform readily.

A metallic fastening fitting 110 having the form of a large-diameter circular tube is vulcanization bonded to the outside peripheral edge (in this embodiment, to the outside peripheral face) of the diaphragm 108. A mating projection 112 extending in a flange-shape around the entire circumference is integrally formed at the upper end opening of the fastening fitting 110. The inside peripheral face of the fastening fitting 110 is covered by a thin seal rubber layer integrally formed with the diaphragm 108 and the diaphragm 108 extends downward from the fastening fitting 110.

This fastening fitting 110 is fitted externally onto the fastening member 64 from the axial upper end thereof, and then the fastening fitting 110 is subjected to a diameter-constricting process. With this arrangement, the inside peripheral face of the upper end portion of the fastening fitting 110 is securely fastened externally onto the outside peripheral face of the other axial end (the lower end in FIG. 1) of the fastening member 64 projecting axially outward from the second mounting member 14, via the seal rubber layer. The mating projection 112 of the fastening fitting 110 is fastened locking into the lower mating groove 76 of the fastening member 64.

By means of this arrangement, the opening of the lower recess 66 of the fastening member 64 is covered fluid-tightly by the diaphragm 108. The other opening (the lower opening in FIG. 1) of the second mounting member 14 is sealed off fluid-tightly by the diaphragm 108. Further, the partition member 30 and the fastening member 64 are positioned between the faces of the main rubber elastic body 16 and the diaphragm 108 in opposition in the axial direction (the vertical direction in FIG. 1).

As described above, the space between the superposed faces of the main rubber elastic body 16 and the diaphragm 108 is sealed off from the outside space, and in that sealed off space is formed a fluid chamber 114 in which a non-compressible fluid is sealed. As the sealed fluid, it is possible to use water, an alkylene glycol, a polyalkylene glycol, silicone oil or the like. In order to effectively attain vibration damping action based on flow behavior such as resonance behavior of the fluid, a low-viscosity fluid having viscosity of 0.1 Pa·s or lower is preferred.

Sealing of the non-compressible fluid within the fluid chamber 114 is advantageously accomplished, for example, by carrying out the process of assembling the partition member 30, the fastening member 64, and the diaphragm 108 with the integrally vulcanization molded component of the main rubber elastic body 16 incorporating the first and second mounting members 12, 14, while these are immersed in the non-compressible fluid.

More specifically, the step of sealing of this non-compressible fluid can be accomplished, for example, by carrying out both steps of: inserting the assembly of the partition member 30 and the fastening member 64 into the integrally vulcanization molded component of the main rubber elastic body 16 and subjecting the second mounting member 14 to a diameter-constricting process; and attaching the diaphragm 108 to the fastening member 64 and subjecting the fastening fitting 110 to a diameter-constricting process, while immersed in the non-compressible fluid. Alternatively, it may be realized by carrying out the process of inserting the assembly of the partition member 30 and the fastening member 64 and subjecting the second mounting member 14 to the diameter-constricting process in the atmosphere, and then attaching the diaphragm 108 to the fastening member 64 in the non-compressible fluid. Otherwise, it is also possible to seal the non-compressible fluid by attaching the diaphragm 108 to the assembly of the partition member 30 and the fastening member 64, which was assembled in the atmosphere in advance, and then inserting the assembly of the partition member 30, the fastening member 64, and the diaphragm 108 into the second mounting member 14 in the non-compressible fluid.

Within the interior of the fluid chamber 114, the partition member 30 and the fastening member 64 are arranged so as to extend in the axis-perpendicular direction, thereby dividing the chamber into two parts in the vertical or axial direction to either side of the assembly of the partition member 30 and the fastening member 64. To one side of this assembly of partition member 30 and others in the axial direction (the upper side in FIG. 1), there is formed the primary fluid chamber 116 a portion of whose wall is constituted by the main rubber elastic body 16, and which gives rise to pressure fluctuations on the basis of elastic deformation of the main rubber elastic body 16 when vibration is input across the first mounting member 12 and the second mounting member 14. To the other side of the assembly of partition member 30 and others in the axial direction (the lower side in FIG. 1), there is formed an equilibrium fluid chamber 118 whose wall is partially constituted by the diaphragm 108 and that readily permits change in volume on the basis of elastic deformation of the diaphragm 108.

Within the equilibrium fluid chamber 118, the mating projection 58 formed in the partition member 30 is covered by the cover member 82 of the fastening member 64. With this arrangement, damage to the diaphragm 108 which is caused by the diaphragm 108 interfering with the mating projection 58 is avoided.

Between the partition member 30 and the fastening member 64 superposed against each other is formed an internal space by means of the central recess 32 of the partition member 30 being covered by the fastening member 64. This internal space is partitioned by the pressure regulating rubber plate 88. The outside peripheral edge of the pressure regulating rubber plate 88 is attached fluid-tightly both to the partition member 30 and to the fastening member 64.

With this arrangement, the opening of the central recess 32 of the partition member 30 is covered by the pressure regulating rubber plate 88, forming within the central recess 32 the auxiliary fluid chamber 120 located above the pressure regulating rubber plate 88 and the working air chamber 100 located below the pressure regulating rubber plate 88. In other words, the equilibrium fluid chamber 118 is formed on the opposite side of the auxiliary fluid chamber 120 from the primary fluid chamber 116, while the working air chamber 100 is formed between the auxiliary fluid chamber 120 and the equilibrium fluid chamber 118. The auxiliary fluid chamber 120, like the primary fluid chamber 116 and the equilibrium fluid chamber 118, has non-compressible fluid sealed therein. The working air chamber 100 is connected to an air conduit 126 outside, described later, through the air passage 102.

As noted, the constrained installation zone 48 is formed on the upper base of the partition member 30 consisting of the septum portion dividing the primary fluid chamber 116 from the auxiliary fluid chamber 120, and the movable plate 52 is positioned housed within the constrained installation zone 48 displaceably at a prescribed amount in its thickness direction (the vertical direction in FIG. 1). The upper and lower faces of this movable plate 52 are subjected to the pressure of the primary fluid chamber 116 and the auxiliary fluid chamber 120 respectively through each plurality of through holes 50. When vibration is input, pressure fluctuations of the primary fluid chamber 116 escape to the auxiliary fluid chamber 120 on the basis of fluctuations of the relative pressure difference between the primary fluid chamber 116 and the auxiliary fluid chamber 120. The extent of displacement of the movable plate 52 and hence the amplitude of pressure fluctuations escaping from the primary fluid chamber 116 to the auxiliary fluid chamber 120 are limited on the basis of limiting the extent of displacement of the movable plate 52 as the movable plate 52 strikes against the partition member 30 or the cover member 46. As will be apparent from the preceding description, a fluid flow level limiting member for limiting fluid flow level through the fluid flow passage consisting of the constrained installation zone 48 and the plurality of through holes 50 is composed including the movable plate 52.

The circumferential groove 36 of the partition member 30 is covered fluid-tightly by the small-diameter tube portion 24, with the seal rubber layer 28 formed on the inside peripheral face of the small-diameter tube portion 24 of the second mounting member 14 sandwiched between them, thereby forming a first orifice passage 122. One end of the first orifice passage 122 connects to the primary fluid chamber 116 via the communication window 38 of the partition member 30. The other end of the first orifice passage 122 connects to the equilibrium fluid chamber 118 via the communication hole 40 of the partition member 30 and the through hole 72 of the fastening member 64. With this arrangement, the primary fluid chamber 116 and the equilibrium fluid chamber 118 are connected to one another through the first orifice passage 122, permitting fluid flow between the two chambers 116, 118 via the first orifice passage 122.

Figure 10:
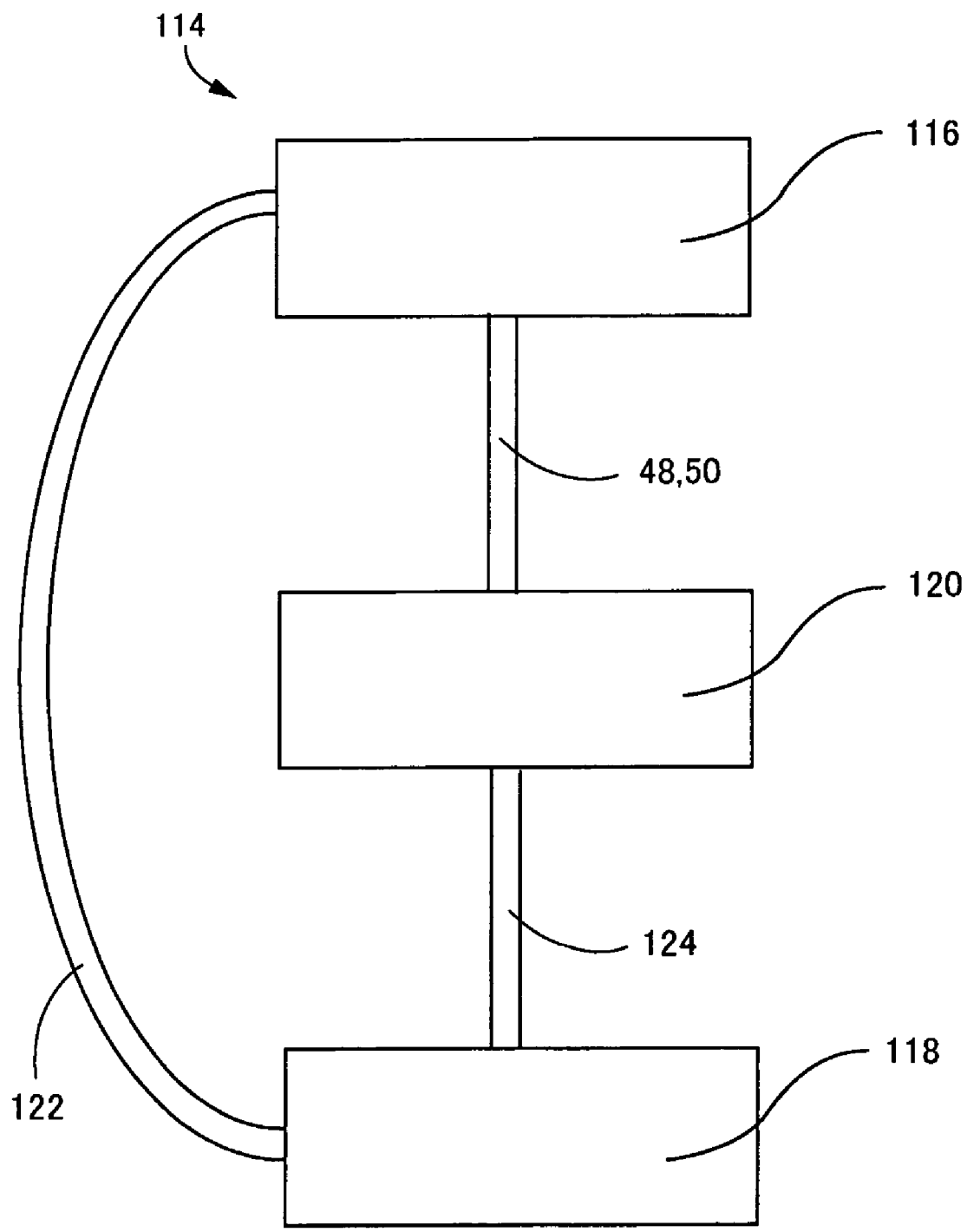
FIG. 10 is a view of a schematic model suitable for explaining a construction of a fluid chamber of the engine mount of FIG. 1.

The communication passage 42 that connects in proximity to the other end of the circumferential groove 36 of the partition member 30, together with the circumferential groove 36, is covered fluid-tightly by the small-diameter tube portion 24 of the second mounting member 14. The circumferential groove 36 and the communication passage 42 cooperate to form a second orifice passage 124. One end of the second orifice passage 124 connects to the auxiliary fluid chamber 120 via the communication passage 42, while the other end of the second orifice passage 124 connects to the equilibrium fluid chamber 118 via the communication hole 40 of the partition member 30 and the through hole 72 of the fastening member 64. Thereby, the auxiliary fluid chamber 120 and the equilibrium fluid chamber 118 communicate with one another through the second orifice passage 124, permitting fluid flow between the two chambers 118, 120 through the second orifice passage 124. As will be apparent from the preceding description, in this mode, the first orifice passage 122 and the second orifice passage 124 are formed by means of cooperation of the partition member 30 and the fastening member 64. Since the communication passage 42 connects to part of the circumferential groove 36, the second orifice passage 124 is formed in cooperation with part of the first orifice passage 122. However, since the passage lengths of the first orifice passage 122 and the second orifice passage 124 are originally quite different from each other, the two passages are individually tuned to an appropriate frequency band described later. Specifically, in the engine mount 10 pertaining to this embodiment, as schematically shown in FIG. 10, the fluid chamber 114 in which a non-compressible fluid is sealed includes the primary fluid chamber 116, the equilibrium fluid chamber 118, and the auxiliary fluid chamber 120. The primary fluid chamber 116 and the auxiliary fluid chamber 120 communicate with each other through the fluid flow passage consisting of the constrained installation zone 48 and the plurality of through holes 50. The primary fluid chamber 116 and the equilibrium fluid chamber 118 communicate with each other through the first orifice passage 122. The auxiliary fluid chamber 120 and the equilibrium fluid chamber 118 communicate with each other through the second orifice passage 124.

In this mode in particular, the resonance frequency of fluid caused to flow through the first orifice passage 122 is tuned so as to produce effective vibration damping action (high damping action) against vibration in a low frequency band of around 10 Hz, corresponding to engine shake, on the basis of the resonance behavior of the fluid. The resonance frequency of fluid caused to flow through the second orifice passage 124 is tuned to a medium frequency band of around 20 -40 Hz, corresponding to idling vibration, on the basis of the resonance behavior of the fluid. With this arrangement, the second orifice passage 124 is tuned to a higher frequency band than the first orifice passage 122, and when vibration in the medium frequency band is input, effective vibration damping action (vibration isolating action through low spring) thereof is produced on the basis of the resonance behavior of the fluid caused to flow through the second orifice passage 124. Tuning of the first and second orifice passages 122, 124 can be accomplished, for example, through adjustment of passage length and passage cross sectional area of each orifice 122, 124 while giving consideration to characteristic values based on the spring rigidity of the walls of the primary fluid chamber 116, the equilibrium fluid chamber 118, and the auxiliary fluid chamber 120, i.e. levels of elastic deformation of the diaphragm 108, movable plate 52, pressure regulating rubber plate 88 or main rubber elastic body 16 corresponding to the level of pressure change needed to produce a given change in unit volume of these fluid chambers 114. Typically, the frequency at which the phase of pressure vibration transmitted through the orifice passages 122, 124 changes to assume an approximately resonant state can be understood to be the tuning frequency of the orifice passages 122, 124.

Using a fastening bolt (not shown), the nut portion 18 of the first mounting member 12 is fastened screwed to a mounting member on the power unit side, and the large-diameter tube portion 22 of the second mounting member 14 is affixed to an outer bracket (not shown), with the outer bracket fastened with a bolt or the like to a mounting member on the car body side. With this arrangement, the engine mount 10 is installed between the power unit and the car body, with the power unit supported in vibration damped fashion on the vehicle body.

In this installed state, an air conduit 126 is connected to the port 104 of the air passage 102 formed in the partition member 30, and the working air chamber 100 is connected to a switch valve 128 through this air conduit 126. The switch valve 128 is composed of an electromagnetic valve or the like, and selectively switches the working air chamber 100 between communication with the outside atmosphere and with a prescribed negative pressure source. The switch valve 128 is also connected to a control unit, not shown. In the control unit, required items of information are input from among information indicating status of the vehicle, such as car speed, engine rpm, reduction gear select position, throttle opening, and so on supplied by various sensors furnished on the car. On the basis of this information, switching operation of the switch valve 128 is carried out in accordance with a pre-established program, by means of microcomputer software or the like. Through appropriate switching control of the switch valve 128 depending on vibration input under various conditions such as the driving conditions of the car, pressure control of the working air chamber 100 is carried out for the purpose of achieving the intended vibration damping action.

Here, specific modes of operation in the engine mount 10 shall be described. Vibration damping action against vibration shall be described hereinbelow in consideration of three types of vibration, namely, (1) engine shake, which represents low frequency, large amplitude vibration; (2) driving booming noise, which represents high frequency, small amplitude vibration; and (3) idling vibration which represents medium frequency, medium amplitude vibration.

(1) Vibration Damping Action against Engine Shake

When low frequency, large amplitude vibration such as engine shake is input, pressure fluctuations of very high amplitude are produced in the primary fluid chamber 116. The movable distance of the movable plate 52 has been established such that pressure fluctuations in the primary fluid chamber 116 are difficult to absorb through displacement of the movable plate 52 within its permitted movable distance range. With this arrangement, the pressure absorbing action of the movable plate 52 is substantially nonfunctional, and effective pressure fluctuations are produced in the primary fluid chamber 116.

That is, during input of low frequency, large amplitude vibration, the movable plate 52 and the auxiliary fluid chamber 120 are substantially nonfunctional. Thus, a level of fluid flow through the first orifice passage 122 is effectively assured by means of relative pressure fluctuations produced between the primary fluid chamber 116 and the equilibrium fluid chamber 118 when such vibration is input, and effective vibration damping action (high attenuating action) against engine shake is attained on the basis of the resonance behavior of the fluid caused to flow through the first orifice passage 122.

The working air chamber 100 may be connected to either the atmosphere or to the negative pressure source. The pressure regulating rubber plate 88 is suctioned and held against the floor of the working air chamber 100 (the upper end face of the fastening member 64), rendering the pressure regulating rubber plate 88 nonfunctional so that the volume of the auxiliary fluid chamber 120 is unchanging. As a result, liquid pressure suction by the auxiliary fluid chamber 120 disappears, ensuring even more advantageously a level of fluid flow through the first orifice passage 122.

(2) Vibration Damping Action Against Driving Booming Noise

When driving booming noise or other such high frequency, small amplitude vibration higher than the tuning frequency of the second orifice passage 124 is input, pressure fluctuations of small amplitude are produced in the primary fluid chamber 116. During such pressure fluctuations the movable plate 52 effectively undergoes displacement, and by means of displacement of the movable plate 52 within its movable distance range, the pressure fluctuations of the primary fluid chamber 116 are efficiently transmitted to the auxiliary fluid chamber 120, so that in the auxiliary fluid chamber 120, liquid pressure suction action based on elastic deformation of the pressure regulating rubber plate 88 is achieved. That is, when high frequency, small amplitude vibration is input, the liquid pressure suction function produced through cooperative action on the part of the movable plate 52, the auxiliary fluid chamber 120, and the pressure regulating rubber plate 88 becomes operational, and pressure fluctuations in the primary fluid chamber 116 are absorbed by the auxiliary fluid chamber 120, thus avoiding markedly highly dynamic spring by the mount 10.

During input of high frequency, small amplitude vibration, the first orifice passage 122 and the second orifice passage 124, which are tuned to lower frequency bands, experience a marked rise in fluid flow resistance due to anti-resonance behavior, becoming substantially blocked off.

That is, while in this state, the primary fluid chamber 116 and the auxiliary fluid chamber 120 into which the pressure of the former has escaped each assume a cut-off state independent from the equilibrium fluid chamber 118, the pressure regulating rubber plate 88 which constitutes part of the wall of the auxiliary fluid chamber 120 is permitted to undergo elastic deformation relatively easily, due to the working air chamber 100 formed behind it being open to the atmosphere. In particular, the pressure regulating rubber plate 88 has been given spring properties soft enough to sufficiently absorb elastic deformation produced by pressure fluctuations in the auxiliary fluid chamber 120 on the order of those created during input of high frequency, small amplitude vibration such as drive booming noise. Consequently, development of markedly highly dynamic spring due to substantial closing off of the first and second orifice passages 122, 124 is avoided, and good vibration damping action (vibration isolating action through low spring properties) against high frequency, small amplitude vibration is attained.

(3) Vibration Damping Action Against Idling Vibration

When idling vibration or other such medium frequency, medium amplitude vibration higher than the tuning frequency of the first orifice passage 122 is input, pressure fluctuations of a certain amplitude are produced in the primary fluid chamber 116. During these pressure fluctuations the movable plate 52 undergoes displacement, and by means of displacement of the movable plate 52 within its movable distance range, the pressure fluctuations of the primary fluid chamber 116 are transmitted to the auxiliary fluid chamber 120. During input of medium frequency, medium amplitude vibration, the first orifice passage 122, which are tuned to a lower frequency band, experiences a marked rise in fluid flow resistance due to anti-resonance behavior, becoming substantially blocked off.

In this state, the auxiliary fluid chamber 120 and the variable-capacity equilibrium fluid chamber 118, in which effective pressure fluctuations are produced in the same manner as in the primary fluid chamber 116, are constituted so as to be connected through the second orifice passage 124 which has been tuned to the medium frequency band. Consequently, a level of fluid flow through the second orifice passage 124 is effectively assured by means of relative pressure fluctuations produced between the primary fluid chamber 116, the auxiliary fluid chamber 120, and the equilibrium fluid chamber 118 when vibration is input, and effective vibration damping action (vibration isolating action through low spring properties) against idling vibration is attained on the basis of the resonance behavior of the fluid caused to flow through the second orifice passage 124.

In this mode, when vibration in the tuning frequency band of the second orifice passage 124 is input, the working air chamber 100 may be connected to either the atmosphere or to the negative pressure source. These can be set according to the required vibration damping characteristics, switching between them as appropriate.

Specifically, in this mode, the spring properties of the pressure regulating rubber plate 88 making up the wall of the auxiliary fluid chamber 120 will vary depending on whether the working air chamber 100 is connected to the atmosphere or to the negative pressure source. First, with the working air chamber 100 connected to the atmosphere, the pressure regulating rubber plate 88 is in the unconstrained state and exhibits soft spring properties. Where the working air chamber 100 is connected to the negative pressure source on the other hand, the pressure regulating rubber plate 88 is subjected to negative pressure suction and deforms towards the working air chamber 100 side, and as the suction intensifies the pressure regulating rubber plate 88 becomes superposed against the floor of the working air chamber 100, constraining deformation thereof so that it now exhibits hard spring characteristics. Consequently, the wall spring rigidity of the auxiliary fluid chamber 120 varies depending on whether the working air chamber 100 is connected to the atmosphere or to the negative pressure source, and as a result to tuning frequency of the second orifice passage 124 changes, and the frequency at which effective vibration damping action is achieved changes as well. As will be apparent thereby, the pressure regulating rubber plate 88 has spring properties that are not as soft as those of the diaphragm 108, and its spring rigidity is such that on the basis of elastic deformation thereof, pressure fluctuations produced in the auxiliary fluid chamber 120 during input of medium frequency, medium amplitude vibration such as idling vibration the vibration cannot be absorbed, so that pressure fluctuations sufficient to create fluid flow through the second orifice passage 124 are produced in the auxiliary fluid chamber 120.

Accordingly, during the ordinary idling state or a fast idling state such as at startup or during operation of the air conditioner, by switching the switch valve 128 in order to selectively switch the working air chamber 100 to the atmosphere or to the negative pressure source, it is possible to attain even better vibration damping action by tuning the second orifice passage 124 with greater precision against idling vibration in different frequencies ranging from several Hz to several tens of Hz within a medium frequency range.

The element of modifying the tuning of the second orifice passage 124 by switching the switch valve 128 according to vehicle conditions within the frequency band in which idling vibration occurs is not an essential element of the invention. For example, in cases where the level of variation in idling vibration is relatively small, the working air chamber 100 may be kept normally connected to the negative pressure source during idling. Thus, it is possible in this state to more advantageously assure the level of fluid flow through the second orifice passage 124 and to tune it so as to more effectively attain vibration damping action against idling vibration, thereby affording a higher degree of vibration damping action.

Further, the engine mount 10 pertaining to this embodiment employs a specific structure so as to be able to consistently ensure a high level of the fluid-tightness of the fluid chamber 114, particularly of the auxiliary fluid chamber 120 and the working air chamber 100, and to realize stable spring properties of the pressure regulating rubber plate 88.

That is, the outside diameter dimension of the flange portion 92, which represents the maximum outside diameter dimension of the fitting ring 90, is smaller than the inside diameter dimension of the central recess 32 of the partition member 30 on the opening side of the step portion 34 of the central recess 32, in which the fitting ring 90 is to be disposed. The inside and outside diameter dimension of the sealing lip 98 are established in consideration of the inside and outside diameter dimension of the step portion 34 so as to be axially superposed against the stepped face of the step portion 34.

Figure 11:
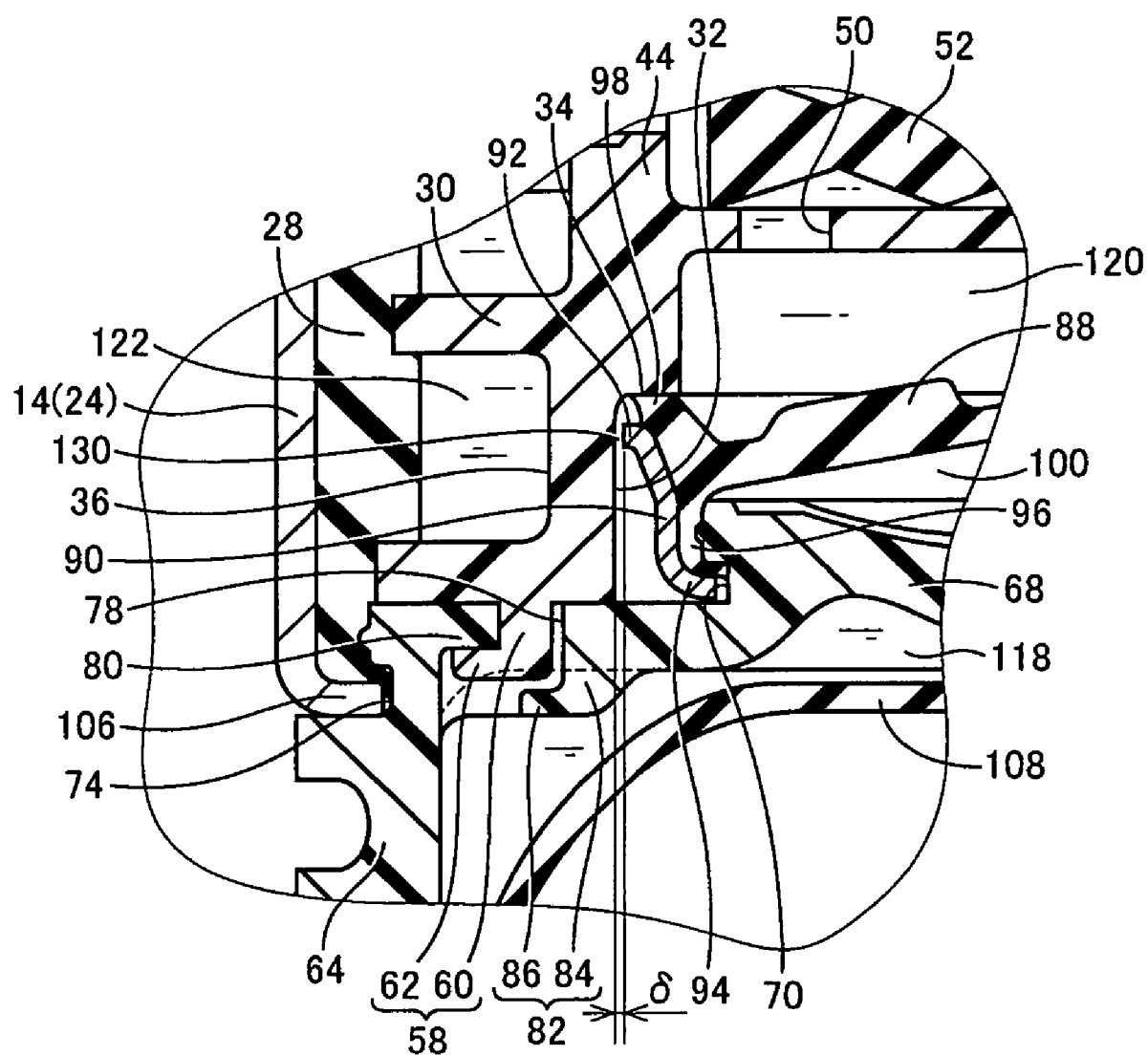
FIG. 11 is an enlarged cross sectional view of a principle part of the engine mount of FIG. 1.

This arrangement gives the advantage upon attaching into the partition member 30 the fastening member 64 to which the pressure regulating rubber plate 88 is fixed by means of fixation of the fitting ring 90 thereto in advance as described above. Namely, when the fitting ring 90 is inserted into the central recess 32, a gap in the diametrical direction is presented, making it easy to axially insert the fitting ring 90 into the central recess 32. The partition member 30 and the fastening member 64 are fastened detained to each other so that the sealing lip 98 is clamped between the flange portion 92 and the step portion 34 and undergoes compressive deformation in the axial direction. During this process, as shown in FIG. 11, the sealing lip 98 with the triangular cross section undergoes compressive deformation so as to incline diametrically outward, namely, toward the outside peripheral side of the flange portion 92.

A gap 130 in the diametrical direction is formed between the fitting ring 90 and the peripheral wall of the opening side of the central recess 32 attached to one another. In this embodiment in particular, the gap 130 is formed between the diametrically opposed faces of the flange portion 92 and the peripheral wall of the central recess 32 with a generally unchanging size: δ around the entire circumference in the circumferential direction, with the partition member 30 and the fastening member 64 being positioned in a coaxial arrangement and attached to the second mounting member 14. Alternatively, the size: δ of the diametrical gap 130 may vary in the circumferential direction after attaching the partition member 30 and the fastening member 64 to the second mounting member 14.

Further, with this fitting ring 90 attached to the central recess 32, in the sealing lip 98 being clamped and deformed in the axial direction between the flange portion 92 of the fitting ring 90 and the step portion 34 of the central recess 32, a gap of prescribed size in the diametrical direction also remains all the way around the circumference between the outside peripheral side of the sealing lip 98 and the inside peripheral face of the central recess 32. Specifically, the partition member 30 and the fastening member 64 are fastened fitting together with the second mounting member 14 in a state that the fitting ring 90 is inserted into the central recess 32 and the sealing lip 98 formed projecting from the fitting ring 90 is pressed fluid-tightly in the axial direction against the step portion 34 of the partition member 30 around the entire circumference, while the gap 130 remains in the diametrical direction between the inside peripheral face of the peripheral wall of the central recess 32 and the flange portion 92 of the fitting ring 90 as well as the sealing lip 98.

In the automotive engine mount 10 of construction as described above, the fitting ring 90 is fitted internally into the central recess 32 of the partition member 30, while the sealing lip 98 formed projecting from the fitting ring 90 contacts with the step portion 34 of the central recess 32 and undergoes compressive deformation in the axial direction, sealing the space between the axially opposed faces of the partition member 30 and the fitting ring 90.

In this embodiment in particular, when the partition member 30 and the fastening member 64 are superposed against one another in the axial direction of the second mounting member 14, the sealing lip 98 is able to function as an elastic material sandwiched between the partition member 30 and the fastening member 64. Based on the elastic recovery force of the sealing lip 98, force (reaction force) acting in the direction urging the partition member 30 and the fastening member 64 away from each other is imparted to them, thereby further enhancing the locking action of the mating projections 58 and the engaging holes 78 (outside peripheral wall portions 80). Consequently, the attached state of the partition member 30 and the fastening member 64 become stabilized, thereby improving ease of handling.

Also, in the automotive engine mount 10 according to this embodiment, due to the existence of the gap 130 furnished between the peripheral wall of the central recess 32 and the fitting ring 90, the peripheral wall and the fitting ring 90 can be prevented from striking against each other by means of relative displacement. Even in the case they should strike against each other, creation of high levels of strain or stress concentrations can be avoided. Consequently, even if the partition member 30 and the fastening member 64 should experience relative displacement in the axis-perpendicular direction during diameter constriction of the second mounting member 14 for example, such a position shift can be absorbed by this gap 130.

Accordingly, no great force will affect among the fitting ring 90, the partition member 30, and fastening member 64, thereby surely attaining a high level of fluid-tightness among the fitting ring 90, the partition member 30, and the fastening member 64.

Also, in this mode, the cover members 82 of the fastening member 64 cover substantially entirely the mating projections 58 projecting out on the equilibrium fluid chamber 118 side. Accordingly, even if the mating projection 58 should break off for some reason, for example, the mating projection 58 is prevented from falling into the equilibrium fluid chamber 118 by the cover member 82. Consequently, it is possible to avoid the problems which could be caused by the broken piece or the like of the mating projection 58 falling into the equilibrium fluid chamber 118, such as damage to the diaphragm 108 or clogging of the orifice passages 122, 124.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For example, it would be possible to make the main rubber elastic body 16 which is formed as separate elements be able to attach fluid-tightly to the second mounting member 14 by means of vulcanization bonding a fitting tubular member to the outside peripheral face of the main rubber elastic body 16 and pressing this fitting tubular member fit into the upper opening of the second mounting member 14 or the like, and to vulcanization bond the outside peripheral edge of the rubber diaphragm 108 to the lower opening of the second mounting member 14, preferably integrally forming this rubber diaphragm 108 with the seal rubber layer 28. By employing the second mounting member 14 of this construction, it would be possible to insert and attach the partition member 30 and the fastening member 64 from the side of the upper opening (the opening sealed off by the main rubber elastic body 16) of the second mounting member 14.

Fastening the partition member 30 and the fastening member 64 together temporarily in the axial direction in advance prior to attaching them to the second mounting member 14 is not an essential element of the invention. Here, when the two members 30, 64 are temporarily fastened together in advance, various structures such as welding, bolts, pins or the like could be employed as structures fastening them temporarily in the superposed state in the axial direction. Such structures for temporary fastening of the partition member 30 and the fastening member 64 are not essential elements of the invention.

Also, the shape, size, construction, location, number and other aspects of the first orifice passage 122, the second orifice passage 124, primary fluid chamber 116, the equilibrium fluid chamber 118, and the auxiliary fluid chamber 120 can be modified appropriately depending on the required vibration damping characteristics and ease of fabrication, and are not limited to those taught hereinabove by way of example. For example, the first orifice passage 122, the second orifice passage 124, and the equilibrium fluid chamber 118 are not essential elements of the invention.

In the case where the equilibrium fluid chamber 118 is not formed, it is possible to employ only the fluid flow passage consisting of the constrained installation zone 48 and the through holes 50, 50, and the fluid pressure absorbing mechanism consisting of the movable plate 52 serving as a fluid flow level limiting member, with neither the first orifice passage 122 nor the second orifice passage 124 formed. The movable plate 52 is not an essential element of the invention.

Additionally, in the preceding embodiment, the invention is described as being implemented in an automotive engine mount 10, the invention could be implemented in an automotive body mount or differential mount, or in vibration damping mounts for vibrating objects of various kinds besides automobiles.

What is claimed is:

1. A fluid filled vibration damping device comprising:
   a first mounting member;
   a second mounting member of tubular shape and being positioned with a first axial open end thereof oriented toward the first mounting member;
   a main rubber elastic body elastically connecting the first mounting member and the second mounting member so that the first axial open end of the second mounting member is fluid-tightly closed by means of the rubber elastic body;
   a partition member disposed fitting within and supported fixedly at an axial medial portion of the second mounting member forming between the main rubber elastic body and the partition member a primary fluid chamber whose wall is partially defined by the main rubber elastic body, and being filled with a non-compressible fluid, the partition member being furnished with a recess that opens onto a side thereof opposite from the primary fluid chamber;
   a rubber elastic plate covering an opening of the recess so as to form an auxiliary fluid chamber whose wall is partially defined by the rubber elastic plate, and being filled with the non-compressible fluid;
   a fluid flow passage permitting a fluid communication between the primary fluid chamber and the auxiliary fluid chamber;
   a fastening member superposed against an axial end of the partition member where the opening of the recess is situated, the fastening member being fitted into the second mounting member together with the partition member, and secured fitting therein by means of diameter constriction of the second mounting member; and
   a working air chamber being formed by means of cooperation between the rubber elastic plate and the fastening member, and being situated to an opposite side of the rubber elastic plate from the auxiliary fluid chamber;
   an annular mounting fitting affixed to an outside peripheral edge of the rubber elastic plate, and having a flange portion flaring diametrically outward at one axial end thereof such that a maximum outside diameter dimension of the annular mounting fitting inclusive of the flange portion is smaller than an inside diameter dimension of the recess of the partition member, while another axial end of the mounting fitting extends radially inwardly toward the rubber elastic plate;
   a seal rubber projection disposed on the one axial end of the mounting fitting so as to project axially outward from the flange portion;
   a seal rubber layer formed covering an inside peripheral face of the other axial end of the mounting fitting; and
   a mating projection portion formed on the fastening member so as to project towards the recess of the partition member,
   wherein the other axial end of the mounting fitting is fastened externally and fluid-tightly onto the mating projection portion with the seal rubber layer sandwiched therebetween and the mounting fitting is inserted into the recess of the partition member,
   wherein with the seal rubber projection projected from the one axial end of the mounting fitting pressed fluid-tightly in an axial direction against the partition member around an entire circumference, and with a gap formed in a diametrical direction between an inside face of the recess of the partition member and the flange portion of the mounting fitting as well as the seal rubber projection, the partition member and the fastening member are fastened fitting together with the second mounting member.

2. A fluid filled vibration damping device according to claim 1, wherein an outside diameter dimension of the mounting fitting changes at an axially medial portion of a tubular section thereof such that an outside diameter dimension at the one axial end of the mounting fitting where the seal rubber projection is formed is larger than that of the other axial end of the mounting fitting.

3. A fluid filled vibration damping device according to claim 1, further comprises an air passage through which air pressure is exerted on the working air chamber from an outside.

4. A fluid filled vibration damping device according to claim 1, wherein an annular mating projection that projects diametrically inward is integrally formed at an opening of the other axial end of the mounting fitting; and a mating groove is formed extending around an entire circumference on an outside peripheral face of the mating projection portion of the fastening member, the annular mating projection inserted into and mated with the mating groove for preventing the mounting fitting from becoming detached from the mating projection portion.

5. A fluid filled vibration damping device according to claim 1, further comprising: a flexible film disposed at an opening of an other axial end of the second mounting member so as to form an equilibrium chamber whose wall is partially defined by the flexible film to a side of the auxiliary fluid chamber opposite from the primary fluid chamber, the equilibrium chamber being filled with the non-compressible fluid; and a first orifice passage for connecting the equilibrium chamber to the primary fluid chamber.

6. A fluid filled vibration damping device according to claim 5, further comprising: a second orifice passage connecting the auxiliary fluid chamber to the equilibrium chamber, and being tuned to a higher frequency band than the first orifice passage.

7. A fluid filled vibration damping device according to claim 5, further comprising a fluid flow level limiting member for limiting fluid flow level through the fluid flow passage.

8. A fluid filled vibration damping device according to claim 5, wherein the second mounting member is fastened externally onto one axial end of the fastening member; and an other axial end of the fastening member projects axially outward from the second mounting member; while an annular fastening fitting is bonded by vulcanization to an outside peripheral edge of the flexible film, and is fastened fitting to the other axial end of the fastening member projecting axially outward.

9. A fluid filled vibration damping device according to claim 1, wherein the inside face of the recess of the partition member includes an annular step portion located at an axial medial portion thereof and providing a stepped face extending in an axis-perpendicular direction so that a small diameter portion and a large diameter portion are located on axially both sides of the annular step portion; the small diameter portion of the recess has a diameter smaller than an inside diameter dimension of the seal rubber projection so that the flange portion of the mounting fitting presses the seal rubber projection against the stepped face of the step portion in the axial direction; and the large diameter portion of the recess has a diameter larger than the maximum outside diameter dimension of the mounting fitting so that the gap is formed in the diametrical direction between the inside face of the recess of the partition member and the flange portion of the mounting fitting as well as the seal rubber projection.

10. A method of manufacturing a fluid filled vibration damping device including: a first mounting member; a second mounting member of tubular shape and being positioned with a first axial open end thereof oriented toward the first mounting member; a main rubber elastic body elastically connecting the first mounting member and the second mounting member so that the first axial open end of the second mounting member is fluid-tightly closed by means of the rubber elastic body; a partition member disposed fitting within and supported fixedly at an axial medial portion of the second mounting member forming between the main rubber elastic body and the partition member a primary fluid chamber whose wall is partially defined by the main rubber elastic body, and being filled with a non-compressible fluid, the partition member being furnished with a recess that opens onto a side thereof opposite from the primary fluid chamber; a rubber elastic plate covering an opening of the recess so as to form an auxiliary fluid chamber whose wall is partially defined by the rubber elastic plate, and being filled with the non-compressible fluid; a fluid flow passage permitting a fluid communication between the primary fluid chamber and the auxiliary fluid chamber; a fastening member superposed against an axial end of the partition member where the opening of the recess is situated, the fastening member being fitted into the second mounting member together with the partition member, and secured fitting therein by means of diameter constriction of the second mounting member; and a working air chamber being formed by means of cooperation between the rubber elastic plate and the fastening member, and being situated to an opposite side of the rubber elastic plate from the auxiliary fluid chamber; an annular mounting fitting affixed to an outside peripheral edge of the rubber elastic plate, and having a flange portion flaring diametrically outward at one axial end thereof such that a maximum outside diameter dimension of the annular mounting fitting inclusive of the flange portion is smaller than an inside diameter dimension of the recess of the partition member, while another axial end of the mounting fitting extends radially inwardly toward the rubber elastic plate; a seal rubber projection disposed on the one axial end of the mounting fitting so as to project axially outward from the flange portion; a seal rubber layer formed covering an inside peripheral face of the other axial end of the mounting fitting; and a mating projection portion formed on the fastening member so as to project towards the recess of the partition member, wherein the other axial end of the mounting fitting is fastened externally and fluid-tightly onto the mating projection portion with the seal rubber layer sandwiched therebetween and the mounting fitting is inserted into the recess of the partition member, wherein with the seal rubber projection projected from the one axial end of the mounting fitting pressed fluid-tightly in an axial direction against the partition member around an entire circumference, and with a gap formed in a diametrical direction between an inside face of the recess of the partition member and the flange portion of the mounting fitting as well as the seal rubber projection, the partition member and the fastening member are fastened fitting together with the second mounting member, the method comprising the following steps:

a step of producing an integrally vulcanization molded component of the rubber elastic plate, by vulcanization molding the rubber elastic plate integrally having the seal rubber projection and the seal rubber layer and bonded by vulcanization to the mounting fitting;

a step of subjecting the mounting fitting of the integrally vulcanization molded component of the rubber elastic plate to a diameter constricting operation carried out with the mounting fitting fitted externally onto the mating projection portion of the fastening member which has been separately prepared, to fit together and fasten the other axial end of the mounting fitting with the mating projection portion;

a rubber elastic plate attachment step wherein the fastening member is superposed against the partition member from a side thereof where opening of the recess is situated, the integrally vulcanization molded component of the rubber elastic plate fastened to the fastening member is inserted into the recess of the partition member, and the seal rubber projection projected from the one axial end of the mounting fitting is pushed in the axial direction against the partition member; and a step of subjecting a tubular section of the second mounting member to a diameter constriction process, carried out with the partition member and the fastening member superposed against one another in the axial direction and inserted into the tubular section of the second mounting member.

11. A method of manufacturing a fluid filled vibration damping device according to claim 10, further comprising a step of superposing the partition member and the fastening member against each other in the axial direction and fastened together, prior to inserting the partition member and the fastening member into the tubular section of the second mounting member.

* * * * *